US006922464B2

(12) United States Patent
Bailey

(10) Patent No.: US 6,922,464 B2
(45) Date of Patent: Jul. 26, 2005

(54) SYSTEM AND METHOD FOR HITLESS MONITORING ACCESS OF A COMMUNICATIONS CIRCUIT

(75) Inventor: George R. Bailey, Gaithersburg, MD (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 148 days.

(21) Appl. No.: 10/632,901

(22) Filed: Aug. 4, 2003

(65) Prior Publication Data

US 2005/0031089 A1 Feb. 10, 2005

(51) Int. Cl.[7] ........................... H04M 1/24; H04M 3/08; H04M 3/22

(52) U.S. Cl. ................... 379/1.03; 379/1.01; 379/27.06; 379/28; 379/394

(58) Field of Search ............................... 379/1.01, 1.03, 379/1.04, 27.01, 27.05, 27.06, 27.07, 28, 29.01, 32.01, 32.02, 394; 324/600

(56) References Cited

U.S. PATENT DOCUMENTS

| | | | |
|---|---|---|---|
| 4,949,355 A | * | 8/1990 | Dyke et al. ................. 375/224 |
| 4,996,695 A | | 2/1991 | Dack et al. |
| 5,691,976 A | | 11/1997 | Engdahl et al. |
| 5,703,871 A | | 12/1997 | Pope et al. |
| 5,768,341 A | | 6/1998 | Pryor et al. |
| 5,825,821 A | | 10/1998 | Okuyama |
| 5,875,217 A | | 2/1999 | Hartmann et al. |
| 5,956,324 A | * | 9/1999 | Engdahl et al. ............. 370/242 |
| 6,215,856 B1 | | 4/2001 | Aponte et al. |
| 6,453,014 B1 | | 9/2002 | Jacobson et al. |
| 2002/0025032 A1 | * | 2/2002 | Bailey ........................ 379/938 |
| 2004/0078717 A1 | * | 4/2004 | Allred et al. ................. 714/43 |
| 2005/0031090 A1 | * | 2/2005 | Bailey ........................ 379/1.03 |

* cited by examiner

*Primary Examiner*—Quoc Tran
(74) *Attorney, Agent, or Firm*—Katten Muchin Rosenman, LLP; Gilberto M. Villacorta; Andrew J. Bateman

(57) ABSTRACT

A system for monitoring a communications circuit includes at least one impedance element connected to the communications circuit when the communications circuit is established. Communication devices communicating via the communications circuit adapt to the presence of the at least one impedance element. Each impedance element is switchably connected to a respective reference ground point. The system includes at least one monitor access element configured as a virtual reference ground point. Each impedance element is switchably disconnected from a respective monitor access element. The system includes at least one communications circuit monitor connected to the respective monitor access element. To monitor the communications circuit, the at least one impedance element is switchably connected to the respective monitor access element and switchably disconnected from the respective reference ground point. The communications circuit monitor is thereby connected to the communications circuit without disrupting data communication within the communications circuit.

31 Claims, 18 Drawing Sheets

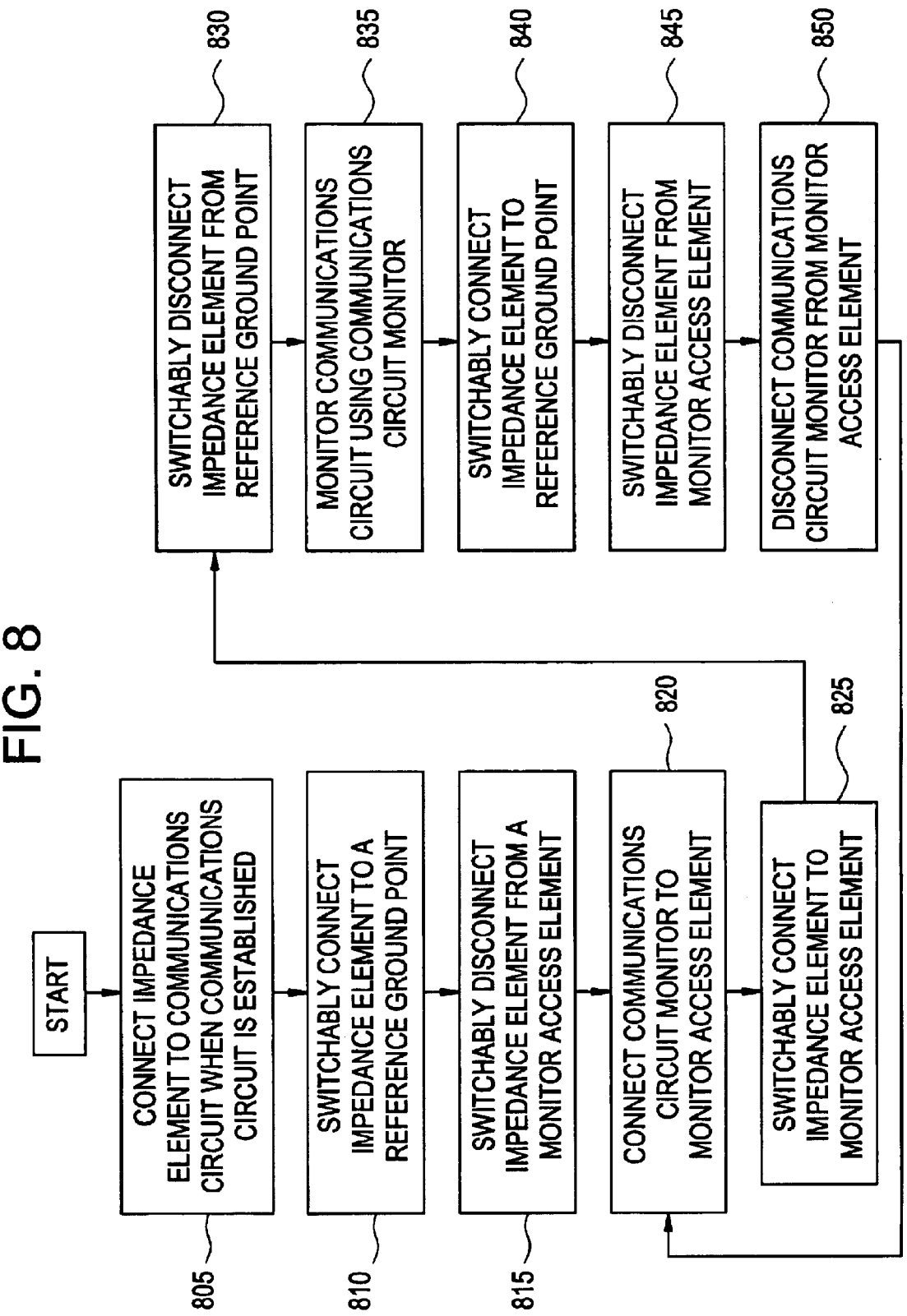

SYSTEM AND METHOD FOR HITLESS MONITORING ACCESS OF A COMMUNICATIONS CIRCUIT

BACKGROUND

1. Field of the Invention

The present invention relates to telecommunications systems. More particularly, the present invention relates to a system and method for providing an application of a monitoring access to a Digital Subscriber Loop (DSL) circuit, so that the monitor access to the circuit is completed without disrupting the ongoing transmissions within the DSL circuit. The establishment of such a monitor access without disruption is referred to as a "hitless" access. The monitoring access application according to exemplary embodiments of the present invention is referred to as the Hitless Monitor Access (HMA) technique.

2. Background Information

Public telecommunications systems include subscribers who are coupled to a telecommunications network with a twisted pair wire loop, commonly known as a subscriber loop. Digital transmission systems based on local subscriber loops are generally called Digital Subscriber Loops (DSLs). Line codes of various formats are used to convey digital data over existing twisted-pair copper telephone lines connecting the telephone company Central Office (CO) to subscribers. Conventional DSL data modems are designed to provide service to a certain percentage of customers at a prescribed data rate. In general, telephone lines employ twisted pairs of wire in order to mitigate crosstalk that can occur between tightly packed pairs carrying unrelated information streams.

Although there are several DSL variants (referred to collectively as "xDSL"), one DSL format is called Asymmetrical Digital Subscriber Loop (ADSL). ADSL has been defined by standards bodies as a communications system specification that provides highly asymmetrical data rates—a low-rate data stream from the subscriber to the CO (from 32 kbps to approximately 640 Kbps when sending data, referred to as the "upstream" rate), and a high-rate data stream from the telephone company CO to the subscriber (from 32 kbps to approximately 6 Mbps when receiving data, referred to as the "downstream" rate) over the same single pair. ADSL can use either Carrierless Amplitude Phase (CAP) modulation or Discrete Multi-Tone (DMT) modulation. In general, in present implementations of the DMT modulation technique, the two directions of information flow are disjoint in the frequency domain. Consequently, it is comparatively simple to protect the receiving means at each end of the path from the co-located transmitting means.

ADSL modems can be installed in pairs, with one of the modems installed at the subscriber location, known as Customer Premises Equipment (CPE), and the other in the telephone company's CO servicing that subscriber. The pair of ADSL modems are connected to the opposite ends of the same twisted-pair and each modem can only communicate with the modem at the other end of the twisted pair. The CO will have a direct connection from its ADSL modem to the service provided (e.g., movies, Internet, etc.). In general, an ADSL modem operates at frequencies higher than the voice-band frequencies.

Another high speed data service is known as a Symmetric Digital Subscriber Loop (SDSL), wherein, unlike an ADSL service, the information rate is intended to be equal in both the upstream and downstream directions. Currently, data speeds as high as 1.5 Mbps in each direction are common, again employing only a single pair of wires. The operating range of a SDSL circuit is, however, limited to approximately 10,000 feet. Furthermore, with current SDSL techniques, the send and receive frequency spectra completely overlap. Thus, the receiver at each end must not only equalize for channel dispersion introduced by the twisted pair, but must also discriminate against the co-located transmitter signal through a process known as echo cancellation. Because of the fast data rates desired, the available bandwidth of the twisted pair must be vigorously exploited.

Inevitably, DSL transmission through a twisted wire pair introduces distortions, and is limited by such things as, for example, loop loss, the noise environment, and modem transceiver technology. The impairments that must be tolerated increase with loop length and bandwidth employed.

For the purposes of network maintenance and assurance of quality of service, it is necessary for the provider of network services to be able to monitor the path established between connected users at various points throughout the network. One such point is the loop connecting the serving modem to the subscriber modem. Abrupt connection, without disruption, of monitoring means to the loop, where the transmission methods are analog, can be conventionally accomplished when narrow bandwidth services are transported, such as Plain Old Telephone Service (POTS) or comparatively slow voice-band modem service. Even well-established high speed data services such as T1, which operates at 1.544 Mbps unidirectionally on any one pair, are simple to monitor, or sample, at an analog point. This is a result of, for example, narrow operating bandwidths, rudimentary encoding techniques, short distances that result in only modest signal level losses, and unidirectional transmissions.

In an attempt to increase the utilization of presently-installed twisted pair loops by employing bi-directional information flow, faster data rates, and longer distances between regeneration devices, DSL services have adopted modems employing considerably more complicated encoding techniques, and significantly more complicated receiving means. One negative ramification of this is that the permissible degree to which a selectively-applied monitor device can alter the apparent characteristics of a transmission path without disruption is markedly reduced.

In order to ensure quality of service, it is often necessary to unobtrusively monitor the progress of communications over the transmission media by connection to the media itself. Unless the monitor facility is permanently in place, the introduction or removal of the monitor, to some degree, disturbs the transmission parameters of the media. In order to minimize disruption of information flow, the loading of the transiently-applied monitor device can be reduced as much a possible, to the point that it can be abruptly applied without harm. However, practical limits prevent the economic realization of a shared monitor with sufficiently large bandwidth and low internal noise, simultaneously with sufficiently slight loading, to consistently permit abrupt application upon, or removal from, presently-employed conventional circuits.

Further, although monitor access can be performed in conventional telephone data transmission systems, as described, for example, in U.S. Pat. No. 6,453,014, it has been difficult to obtain, without disruption, in DSLs.

For example, to obtain, at the point of access, a sample of the voltage waveform appearing between the tip and ring lead of the selected loop, without affecting any of the twisted pair transmission characteristics or disrupting the ongoing communications, a near infinite input impedance buffer amplifier can be employed with accompanying means, of vanishingly-small physical dimensions, to select and connect to the target loop. Alternatively, a less-than-ideal voltage monitor device could be permanently attached to each loop that could be potentially selected. Unfortunately, neither case is practical.

In contrast, a directional coupler can also be used as a sampling device, with the added benefit that the energy contribution of each modem can be sampled and substantially separated. This directivity is a predictable consequence of the characteristics of transmission lines which have been intentionally coupled by placement in close proximity to one another, over a length significant relative to the wavelength of the lowest frequency of interest. However, for the DSL frequency band of approximately 30 kHz to 1 MHz, the dimensions of a true coupled line directional coupler would be ponderous. Thus, an approximation which would be more compact is desired.

As one of ordinary skill in the art would recognize, such an approximation to a distributed directional coupler can be constructed using lumped circuit elements (e.g., discrete resistors, capacitors, and inductors), within any arbitrary accuracy over a given bandwidth, as a function of how finely the constituent inductive and capacitive elements are divided. This approach, however, also poses practical difficulties. Specifically, a lumped-element directional coupler involves many more parts than a simple bridging monitor, some of which (e.g., at least one impedance element) must be introduced in series with the tip and ring leads, not simply tapped to them. The abrupt insertion or removal of such a coupler would create severe data circuit disruptions.

SUMMARY OF THE INVENTION

A system and method are disclosed for monitoring a communications circuit (e.g., 102 in the FIG. 1 embodiment). In accordance with exemplary embodiments, according to a first aspect of the present invention, the system (e.g., 100 in the FIG. 1 embodiment) includes at least one impedance element (e.g., 104, 106 in the FIG. 1 embodiment). The at least one impedance element (104, 106) is configured to be connected to the communications circuit (102) when the communications circuit (102) is established. The at least one impedance element (104, 106) causes communication devices communicating via the communications circuit to adapt to the presence of the at least one impedance element (104, 106). The system includes at least one reference ground point (e.g., 112, 114 in the FIG. 1 embodiment). Each impedance element (104, 106) is configured to be switchably connected (e.g., 108, 110 in the FIG. 1 embodiment) to a respective reference ground point (112, 114). The system includes at least one monitor access element (e.g., 150, 160 in the FIG. 1 embodiment). Each impedance element (104, 106) is configured to be switchably disconnected (e.g., 116, 118 in the FIG. 1 embodiment) from a respective monitor access element (150, 160). Each monitor access element (150, 160) is configured to be a virtual reference ground point (e.g., mirroring 122, 124 in the FIG. 1 embodiment). The system also includes at least one communications circuit monitor (e.g., 138, 140 in the FIG. 1 embodiment). The at least one communications circuit monitor (138, 140) is configured to be connected to the respective monitor access element (150, 160). According to exemplary embodiments, to monitor the communications circuit (102), the at least one impedance element (104, 106) is configured to be switchably connected (116, 118) to the respective monitor access element (150, 160) and the at least one impedance element (104, 106) is configured to be switchably disconnected (108, 110) from the respective reference ground point (112, 114). The communications circuit monitor (138, 140) is thereby connected to the communications circuit (102) without disrupting data communication within the communications circuit (102). To disconnect the communications circuit monitor (138, 140) from the communications circuit (102) without disrupting data communication within the communications circuit (102), the at least one impedance element (104, 106) is configured to be switchably connected (108, 110) to the respective at least one reference ground point (112, 114) and the at least one impedance element (104, 106) is configured to be switchably disconnected (116, 118) from the respective at least one monitor access element (150, 160).

According to a second aspect of the present invention, a method for monitoring a communications circuit comprises the steps of: i.) connecting (e.g., 805 in the FIG. 8 embodiment) an impedance element to the communications circuit when the communications circuit is established, wherein the impedance element causes communication devices communicating via the communications circuit to adapt to the presence of the impedance element; ii.) switchably connecting (e.g., 810 in the FIG. 8 embodiment) the impedance element to a reference ground point; iii.) switchably disconnecting (e.g., 815 in the FIG. 8 embodiment) the impedance element from a monitor access element, wherein the monitor access element is configured to be a virtual reference ground point; iv.) connecting (e.g., 820 in the FIG. 8 embodiment) a communications circuit monitor to the monitor access element; v.) switchably connecting (e.g., 825 in the FIG. 8 embodiment) the impedance element to the monitor access element; vi.) switchably disconnecting (e.g., 830 in the FIG. 8 embodiment) the impedance element from the reference ground point, thereby connecting the communications circuit monitor to the communications circuit without disrupting data communication within the communications circuit; and vii.) monitoring (e.g., 835 in the FIG. 8 embodiment) the communications circuit using the communications circuit monitor. To disconnect the communications circuit monitor from the communications circuit without disrupting data communication within the communications circuit, the method comprises the steps of: viii.) switchably connecting (e.g., 840 in the FIG. 8 embodiment) the impedance element to the reference ground point; and ix.) switchably disconnecting (e.g., 845 in the FIG. 8 embodiment) the impedance element from the monitor access element.

According to a third aspect of the present invention, a system (e.g., 100 in the FIG. 1 embodiment) for monitoring a communications circuit (e.g., 102 in the FIG. 1 embodiment) includes means for connecting an impedance element (e.g., 104, 106 in the FIG. 1 embodiment) to the communications circuit (102) when the communications circuit (102) is established. The impedance element (104, 106) causes communication devices communicating via the communications circuit (102) to adapt to the presence of the impedance element (104, 106). The system (100) includes means for switchably connecting (e.g., 108, 110 in the FIG. 1 embodiment) the impedance element (104, 106) to a reference ground point (e.g., 112, 114 in the FIG. 1 embodiment). The system (100) includes means for switchably disconnecting (e.g., 116, 118 in the FIG. 1 embodiment) the impedance element (104, 106) from a monitor access element (e.g., 150, 160 in the FIG. 1 embodiment). The monitor access element (150, 160) is configured to be a virtual reference ground point (e.g., mirroring 122, 124 in the FIG. 1 embodiment). The system (100) includes means for connecting a communications circuit monitor (e.g., 138, 140 in the FIG. 1 embodiment) to the monitor access element (150, 160), and means for switchably connecting (e.g., 116, 118 in the FIG. 1 embodiment) the impedance element (104, 106) to the monitor access element (150, 160). The system (100) also includes means for switchably disconnecting (e.g., 108, 110 in the FIG. 1 embodiment) the impedance element (104, 106) from the reference ground point (112, 114), thereby connecting the communications circuit monitor (138, 140) to the communications circuit (102) without disrupting data communication within the communications circuit (102). The system (100) includes means for monitoring the communications circuit using the communications circuit monitor (138, 140). To disconnect the communications circuit monitor (138, 140) from the communications circuit (102) without disrupting data communication within the communications circuit (102), the system (100) includes means for switchably connecting (e.g., 108, 110 in the FIG. 1 embodiment) the impedance element (104, 106) to the reference ground point (112, 114), and means for switchably disconnecting (e.g., 116, 118 in the FIG. 1 embodiment) the impedance element (104, 106) from the monitor access element (150, 160).

According to a fourth aspect of the present invention, a system (e.g., 400 in the FIG. 4 embodiment) for monitoring a communications circuit (e.g., 402 in the FIG. 4 embodiment) includes a first impedance element (e.g., 404 in the FIG. 4 embodiment) connected to a first communications circuit line (e.g., 401 in the FIG. 4 embodiment) of the communications circuit (402) when the communications circuit (402) is established. The system (400) includes a second impedance element (e.g., 406 in the FIG. 4 embodiment) connected to a second communications circuit line (e.g., 403 in the FIG. 4 embodiment) of the communications circuit (402) when the communications circuit (402) is established. The first and second impedance elements (404, 406) are configured to be switchably connected (e.g., 408 in the FIG. 4 embodiment) to form an equivalent selected differential impedance across the communications circuit (402). The differential impedance formed by the first and second impedance elements (404, 406) causes communication devices communicating via the communications circuit (402) to adapt to the presence of the differential impedance. The system includes a monitor access element (e.g., 450 in the FIG. 4 embodiment). The first and second impedance elements (404, 406) are configured to be switchably disconnected (e.g., 410, 412 in the FIG. 4 embodiment) from the monitor access element (450). The monitor access element (450) is configured to be a virtual differential zero impedance (e.g., 422 in the FIG. 4 embodiment). The system (400) also includes a communications circuit monitor (e.g., 428 in the FIG. 4 embodiment). The communications circuit monitor (428) is configured to be connected to the monitor access element (450). According to exemplary embodiments, to monitor the communications circuit (402), the first and second impedance elements (404, 406) are configured to be switchably connected (410, 412) to the monitor access element (450), and the first impedance element (404) is configured to be switchably disconnected (408) from the second impedance element (406). The communications circuit monitor (428) is thereby connected to the communications circuit (402) without disrupting data communication within the communications circuit (402). To disconnect the communications circuit monitor (428) from the communications circuit (402) without disrupting data communication within the communications circuit (402), the first impedance element (404) is configured to be switchably connected (408) to the second impedance element (406) and the first and second impedance elements (404, 406) are configured to be switchably disconnected (410, 412) from the monitor access element (450).

According to a fifth aspect of the present invention, a method for monitoring a communications circuit comprises the steps of: i.) connecting (e.g., 905 in the FIG. 9 embodiment) a first impedance element to a first communications circuit line of the communications circuit and a second impedance element to a second communications circuit line of the communications circuit when the communications circuit is established; ii.) switchably connecting (e.g., 910 in the FIG. 9 embodiment) the first and second impedance elements to form a differential impedance across the communications circuit, wherein the differential impedance formed by the first and second impedance elements causes communication devices communicating via the communications circuit to adapt to the presence of the differential impedance; iii.) switchably disconnecting (e.g., 915 in the FIG. 9 embodiment) the first and second impedance elements from a monitor access element, wherein the monitor access element is configured to be a virtual differential zero impedance; iv.) connecting (e.g., 920 in the FIG. 9 embodiment) a communications circuit monitor to the monitor access element; v.) switchably connecting (e.g., 925 in the FIG. 9 embodiment) the first and second impedance elements to the monitor access element; vi.) switchably disconnecting (e.g., 930 in the FIG. 9 embodiment) the first impedance element from the second impedance element, thereby connecting the communications circuit monitor to the communications circuit without disrupting data communication within the communications circuit; and vii.) monitoring (e.g., 935 in the FIG. 9 embodiment) the communications circuit using the communications circuit monitor. To disconnect the communications circuit monitor from the communications circuit without disrupting data communication within the communications circuit, the method comprises the steps of: viii.) switchably connecting (e.g., 940 in the FIG. 9 embodiment) the first impedance element to the second impedance element; and ix.) switchably disconnecting (e.g., 945 in the FIG. 9 embodiment) the first and second impedance elements from the monitor access element.

According to a sixth aspect of the present invention, a system (e.g., 400 in the FIG. 4 embodiment) for monitoring a communications circuit (e.g., 402 in the FIG. 4 embodiment) includes means for connecting a first impedance element (e.g., 404 in the FIG. 4 embodiment) to a first communications circuit line (e.g., 401 in the FIG. 4 embodiment) of the communications circuit (402) and a second impedance element (e.g., 406 in the FIG. 4 embodiment) to a second communications circuit line (e.g., 403 in the FIG. 4 embodiment) of the communications circuit (402) when the communications circuit (402) is established. The system (400) includes means for switchably connecting (e.g., 408 in the FIG. 4 embodiment) the first and second impedance elements (404, 406) to form a differential impedance across the communications circuit (402). The differential impedance formed by the first and second impedance elements (404, 406) causes communication devices communicating via the communications circuit (402) to adapt to the differential impedance. The system (400) includes means for switchably disconnecting (e.g., 410, 412 in the FIG. 4 embodiment) the first and second impedance elements (404, 406) from a monitor access element (e.g., 450 in the FIG. 4 embodiment). The monitor access element (450) is configured to be a virtual differential zero impedance (e.g., 422 in the FIG. 4 embodiment). The system (400) includes means for connecting a communications circuit monitor (e.g., 428 in the FIG. 4 embodiment) to the monitor access element (450), and means for switchably connecting (e.g., 410, 412 in the FIG. 4 embodiment) the first and second impedance elements (404, 406) to the monitor access element (450). The system (400) also includes means for switchably disconnecting (e.g., 408 in the FIG. 4 embodiment) the first impedance element (404) from the second impedance element (406), thereby connecting the communications circuit monitor (428) to the communications circuit (402) without disrupting data communication within the communications circuit (402). The system (400) includes means for monitoring the communications circuit using the communications circuit monitor (428). To disconnect the communications circuit monitor (428) from the communications circuit (402) without disrupting data communication within the communications circuit (402), the system (400) includes means for switchably connecting (e.g., 408 in the FIG. 4 embodiment) the first impedance element (404) to the second impedance element (406), and means for switchably disconnecting (e.g., 410, 412 in the FIG. 4 embodiment) the first and second impedance elements (404, 406) from the monitor access element (450).

According to a seventh aspect of the present invention, a method of connecting and disconnecting a selected load to/from a communications circuit comprises the step of: i.) connecting (e.g., 1005 in the FIG. 10 embodiment) the selected load to the communications circuit without disrupting data communication within the communications circuit, by substituting the selected load for an equivalent load, wherein the equivalent load is configured to be connected to the communications circuit at the time the communications circuit is established, and wherein the equivalent load causes communications devices communicating via the communications circuit to adapt to the presence of the equivalent load; and ii.) disconnecting (e.g., 1010 in the FIG. 10 embodiment) the selected load from the communications circuit without disrupting data communication within the communications circuit, by substituting the equivalent load for the selected load.

According to an exemplary embodiment of the seventh aspect, the selected load comprises a monitor access element and the equivalent load comprises an impedance element. The step of connecting comprises the steps of: iii.) connecting (e.g., 1105 in the FIG. 11 embodiment) the impedance element to the communications circuit when the communications circuit is established, wherein the impedance element causes communication devices communicating via the communications circuit adapt to the presence of the impedance element, and wherein the impedance element is configured to be connected to a reference ground point; iv.) connecting (e.g., 1110 in the FIG. 11 embodiment) the monitor access element to the communications circuit, wherein the monitor access element is configured to be a virtual reference ground point; and v.) substituting (e.g., 1115 in the FIG. 11 embodiment) the virtual reference ground point of the monitor access element for the reference ground point of the impedance element by switchably connecting the monitor access element to the impedance element and switchably disconnecting the reference ground point from the impedance element, wherein the monitor access element is connected to the communications circuit without disrupting data communication within the communications circuit.

According to the exemplary embodiment of the seventh aspect, the step of disconnecting comprises the steps of: vi.) disconnecting (e.g., 1205 in the FIG. 12 embodiment) the monitor access element from the communications circuit; and vii.) substituting (e.g., 1210 in the FIG. 12 embodiment) the reference ground point of the impedance element for the virtual reference ground point of the monitor access element by switchably connecting the reference ground point to the impedance element and switchably disconnecting the monitor access element from the impedance element, wherein the monitor access element is disconnected from the communications circuit without disrupting data communication within the communications circuit.

According to an alternative exemplary embodiment of the seventh aspect, the selected load comprises a monitor access element and the equivalent load comprises a first and a second impedance element. The step of connecting comprises the steps of: iii.) connecting (e.g., 1305 in the FIG. 13 embodiment) the first and the second impedance elements to the communications circuit when the communications circuit is established, wherein the first and second impedance elements are switchably connected across the communications circuit, and wherein a differential impedance formed by the first and second impedance elements causes communication devices communicating via the communications circuit to adapt to the presence of the differential impedance; iv.) connecting (e.g., 1310 in the FIG. 13 embodiment) the monitor access element to the communications circuit, wherein the monitor access element is configured to be a virtual differential zero impedance; and v.) substituting (e.g., 1315 in the FIG. 13 embodiment) the virtual differential zero impedance of the monitor access element for the differential zero impedance between the first and second impedance elements by switchably connecting the monitor access element to each of the first and second impedance elements and switchably disconnecting the first impedance element from the second impedance element, wherein the monitor access element is connected to the communications circuit without disrupting data communication within the communications circuit.

According to the alternative exemplary embodiment of the seventh aspect, the step of disconnecting comprises the steps of: vi.) disconnecting (e.g., 1405 in the FIG. 14 embodiment) the monitor access element from the communications circuit; and vii.) substituting (e.g., 1410 in the FIG. 14 embodiment) the differential zero impedance between the first and second impedance elements for the virtual differential zero impedance of the monitor access element by switchably connecting the first impedance element to the second impedance element and switchably disconnecting the monitor access element from each of the first and second impedance elements, wherein the monitor access element is disconnected from the communications circuit without disrupting data communication within the communications circuit.

According to an eighth aspect of the present invention, a system for connecting and disconnecting a selected load to/from a communications circuit includes means for connecting the selected load to the communications circuit without disrupting data communication within the communications circuit, by substituting the selected load for an equivalent load. The equivalent load is configured to be connected to the communications circuit at the time the communications circuit is established. The equivalent load causes communication devices communicating via the communications circuit to adapt to the presence of the equivalent load. The system also includes means for disconnecting the selected load from the communications circuit without disrupting data communication within the communications circuit, by substituting the equivalent load for the selected load.

According to an exemplary embodiment of the eighth aspect, the selected load comprises a monitor access element (e.g., 150, 160 in the FIG. 1 embodiment) and the equivalent load comprises an impedance element (e.g., 104, 106 in the FIG. 1 embodiment). The system further includes means for connecting the impedance element (104, 106) to the communications circuit (e.g., 102 in the FIG. 1 embodiment) when the communications circuit (102) is established. The impedance element (104, 106) causes communication devices communicating via the communications circuit (102) to adapt to the presence of the impedance element (104, 106). The impedance element (104, 106) is configured to be switchably connected (e.g., 108, 110 in the FIG. 1 embodiment) to a reference ground point (e.g., 112, 114 in the FIG. 1 embodiment). The system includes means for connecting the monitor access element (e.g., 150, 160 in the FIG. 1 embodiment) to the communications circuit (102). The monitor access element (150, 160) is configured to be a virtual reference ground point (e.g., mirroring 122, 124 in the FIG. 1 embodiment). The system also includes means for substituting the virtual reference ground point (mirroring 122, 124) of the monitor access element (150, 160) for the reference ground point (112, 114) of the impedance element (104, 106) by switchably connecting (e.g., 116, 118 in the FIG. 1 embodiment) the monitor access element (150, 160) to the impedance element (104, 106) and switchably disconnecting (108, 110) the reference ground point (112, 114) from the impedance element (104, 106). The monitor access element (150, 160) is connected to the communications circuit (102) without disrupting data communication within the communications circuit (102).

According to the exemplary embodiment of the eighth aspect, the system further includes means for disconnecting the monitor access element (150, 160) from the communications circuit (102), and means for substituting the reference ground point (112, 114) of the impedance element (104, 106) for the virtual reference ground point (mirroring 122, 124) of the monitor access element (150, 160) by switchably connecting (108, 110) the reference ground point (112, 114) to the impedance element (104, 106) and switchably disconnecting (116, 118) the monitor access element (150, 160) from the impedance element (104, 106). The monitor access element (150, 160) is disconnected from the communications circuit (102) without disrupting data communication within the communications circuit (102).

According to an alternative exemplary embodiment of the eighth aspect, the selected load comprises a monitor access element (e.g., 450 in the FIG. 4 embodiment) and the equivalent load comprises a first (e.g., 404 in the FIG. 4 embodiment) and a second (e.g., 406 in the FIG. 4 embodiment) impedance element. The system further includes means for connecting the first and the second impedance elements (404, 406) to the communications circuit (e.g., 402 in the FIG. 4 embodiment) when the communications circuit (402) is established. The first and second impedance elements (404, 406) are configured to be switchably connected across the communications circuit (402). A differential impedance formed by the first and second impedance elements causes communication devices communicating via the communications circuit (402) to adapt to the presence of the differential impedance. The system includes means for connecting the monitor access element (e.g., 450 in the FIG. 4 embodiment) to the communications circuit (402). The monitor access element (450) is configured to be a virtual differential zero impedance (e.g., 422 in the FIG. 4 embodiment). The system includes means for substituting the virtual differential zero impedance (422) of the monitor access element (450) for the differential zero impedance between the first (404) and second (406) impedance elements by switchably connecting (e.g., 410, 412 in the FIG. 4 embodiment) the monitor access element (450) to each of the first and second impedance elements (404, 406) and switchably disconnecting (e.g., 408 in the FIG. 4 embodiment) the first impedance element (404) from the second impedance element (406). The monitor access element (450) is connected to the communications circuit (402) without disrupting data communication within the communications circuit (402).

According to the alternative exemplary embodiment of the eighth aspect, the system further includes means for disconnecting the monitor access element (450) from the communications circuit (402), and means for substituting the differential zero impedance between the first and second impedance elements (404, 406) for the virtual differential zero impedance (422) of the monitor access element (450) by switchably connecting (408) the first impedance element (404) to the second impedance element (406) and switchably disconnecting (410, 412) the monitor access element (450) from each of the first and second impedance elements (404, 406). The monitor access element (450) is disconnected from the communications circuit (402) without disrupting data communication within the communications circuit (402).

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 8 is a flowchart illustrating steps for hitless monitoring access of a communications circuit, in accordance with an exemplary embodiment of the present invention.

DETAILED DESCRIPTION OF THE PREFERRED EMBODIMENTS

Exemplary embodiments of the present invention are directed to a system and method for hitless monitoring access of a communications circuit. According to exemplary embodiments, a monitoring access is applied to a Digital Subscriber Loop (DSL) circuit, so that the monitor access to the circuit is completed without disrupting the ongoing transmissions within the DSL circuit. The establishment of such a monitor access without disruption is referred to herein as a "hitless" access. The monitoring access application according to exemplary embodiments of the present invention is referred to herein as the Hitless Monitor Access (HMA) technique. With the HMA technique, a potentially disturbing monitor access can be applied to a xDSL circuit by substitution of a monitor device for an equivalent "dummy" impedance termination that has been introduced on the circuit at the time the circuit is established.

Consequently, the equivalent impedance loading of the monitor device becomes an initial and substantially permanent constituent of the circuit characteristics to which the communicating xDSL modems or other communication devices adapt. Having adapted to the equivalent impedance loading of the monitor device, the monitor device and its equivalent impedance loading can be interchangeably switched into the xDSL circuit without affecting the xDSL circuit characteristics. In other words, according to exemplary embodiments, after initial adaptation to the equivalent impedance loading by the communication devices, the xDSL circuit characteristics do not change, and the monitor device can be switched into the xDSL circuit (and the equivalent impedance load switched out, and vice versa) without effecting the xDSL circuit characteristics.

As used herein, the term "xDSL" refers to the different variants of DSL technologies for transmitting high-bandwidth information over twisted-pair (i.e., copper wire) telephone lines, including, for example, ADSL, including ADSL2 and ADSL2+, ADL ADSL, SDSL, HDSL, VDSL, RADSL, UDSL, CDSL, G.Lite or DSL Lite, IDSL, and any other variant of DSL (such as, for example, EC-ADSL, SHDSL, ESHDSL, 10MDSL, M2DSL, BDSL and MMDSL).

Figure 1:
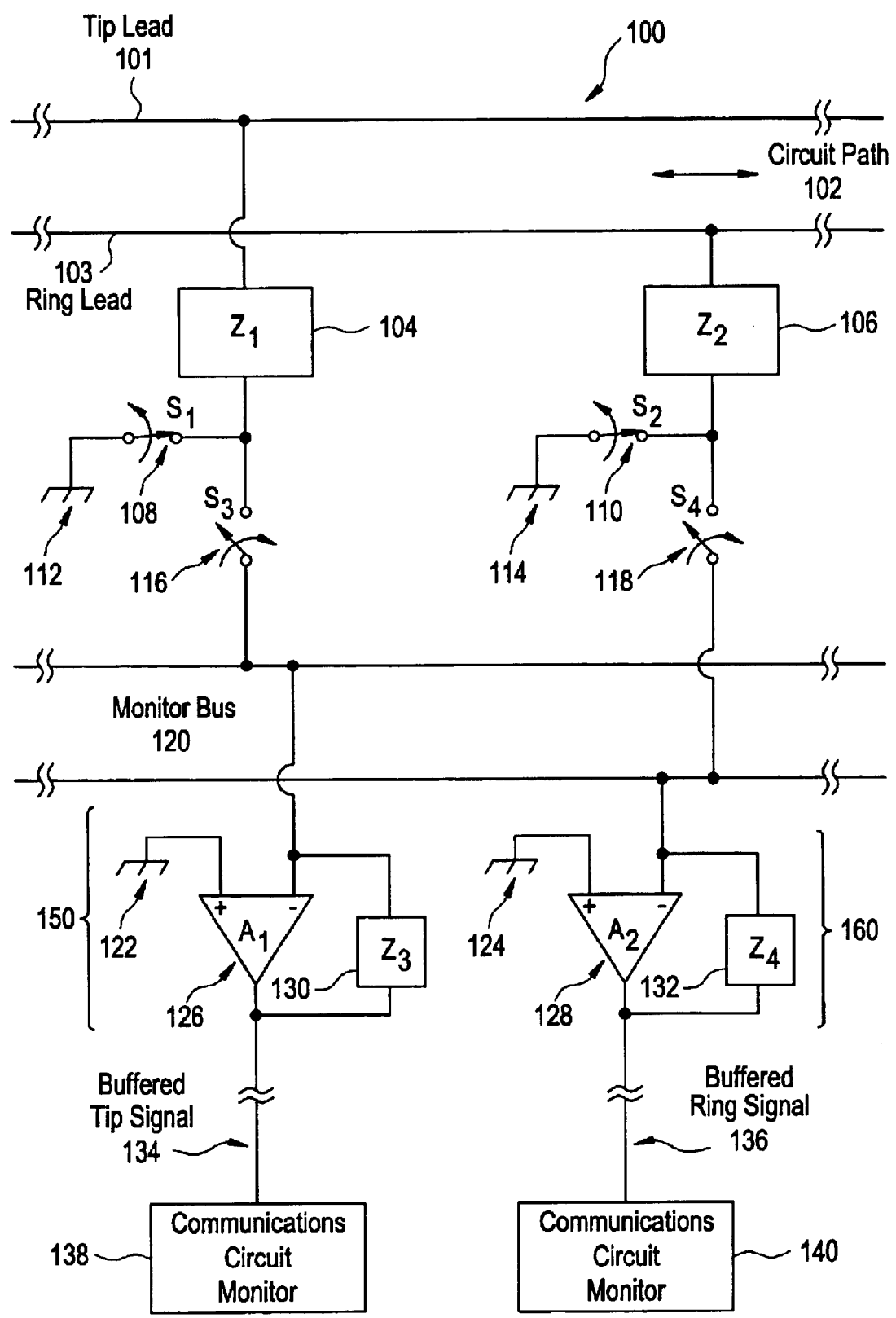
FIG. 1 is a diagram illustrating a system for hitless monitoring access of a communications circuit, in accordance with an exemplary embodiment of the present invention.

These and other aspects of the present invention will now be described in greater detail. FIG. 1 is a diagram illustrating a system 100 for hitless monitoring access of a communications circuit, in accordance with an exemplary embodiment of the present invention. As used herein, a "communications circuit" refers to the physical medium through which information can be communicated. A circuit path 102 can be any type of xDSL communications circuit or any other type of communications circuit for which monitoring access is desired. The circuit path 102 can include, for example, a tip lead 101 and a ring lead 103 as part of a balanced medium, such as a twisted pair of wires, that can comprise the circuit path 102. The depiction of the circuit path 102 with the tip lead 101 and ring lead 103 is for purposes of illustration and not limitation. For example, the circuit path 102 can comprise an unbalanced medium, such as, for example, a coaxial cable, with a single communications circuit line. Communication devices, such as, for example, xDSL modems or other communication devices, connected through circuit path 102 can use circuit path 102 to communicate between the devices.

The system 100 can include at least one impedance element. For example, for the balanced medium illustrated in FIG. 1, the system can include a first impedance element 104 and a second impedance element 106. Those of ordinary skill in the art will recognize that an unbalanced medium can include either first impedance element 104 or second impedance element 106. The at least one impedance element can be connected to the communications circuit when the communications circuit is established. For example, first impedance element 104 can be connected to the tip lead 101 and the second impedance element 106 can be connected to the ring lead 103 of the circuit path 102 using any type of electrical connection for connecting electronic components to a communications circuit, such as circuit path 102.

The at least one impedance element causes communication devices communicating via the communications circuit to substantially permanently adapt to the presence of the at least one impedance element. Thus, according to exemplary embodiments, the communication devices, such as, for example, xDSL modems, communicating across circuit path 102 can adapt to the load imposed by the first and second impedance elements 104, 106 as communication between the communication devices is being established. Impedance elements can be connected to other proximal circuit paths 102 to allow monitoring of these proximal circuit paths 102. The communication devices communicating via these proximal circuit paths 102 can then adapt to the load imposed by the respective impedance elements.

The system 100 can also include at least one reference ground point. For example, the system 100 can include first reference ground point 112 and second reference ground point 114. Each impedance element can be associated with a respective reference ground point and can be switchably connected to the respective reference ground point. For example, first impedance element 104 can be connected to first reference ground point 112 using a first switch 108, and second impedance element 106 can be connected to second reference ground point 114 using a second switch 110. The first and second switches 108, 110 can be any type of electronic or electrical switch or relay that can be used for connecting and disconnecting electronic components. First and second switches 108, 110 can be controlled using control hardware, firmware, software, any combination thereof, or any other type of control circuitry capable of actuating first and second switches 108, 110.

The system 100 can include at least one monitor access element. For example, the system 100 can include a first monitor access element 150 and a second monitor access element 160. According to exemplary embodiments, the first and second monitor access elements 150, 160 can include first and second amplification elements 126, 128, respectively, each configured as an inverting amplifier For example, the amplification element can be any operational amplifier (e.g., an AD8022 offered by Analog Devices of Norwood, Mass.), or any other integrated circuit op-amp of suitable characteristics for the xDSL or communications service to be monitored, and for the desired gain or loss to the buffered output points. Each monitor access element can also include an impedance element. For example, first and second monitor access elements 150, 160 can include third and fourth impedance elements 130, 132, respectively. In an inverting amplifier configuration, the output of first and second amplification elements 126, 128 is fed back through the respective third and fourth impedance elements 130, 132 to the negative input of the respective first and second amplification elements 126, 128. The positive input of the first and second amplification elements 126, 128 is connected to a respective reference ground point 122, 124. According to exemplary embodiments, the negative feedback provided forces a condition at the negative input at the first and second amplification elements 126, 128 that mirrors the condition imposed at the positive input of the first and second amplification elements 126, 128. Since the positive input is grounded, the first and second amplification elements 126, 128 force a corresponding virtual ground condition at their respective negative inputs. Thus, each monitor access element can be configured to be a virtual reference ground point.

Initially, each of the first and second impedance element 104, 106 is switchably disconnected from respective first and second monitor access elements 150, 160, using, for example, a third switch 116 and a fourth switch 118, respectively, connected between each of the first and second impedance elements 104, 106 and each of the first and second monitor access elements 150, 160, respectively. The third and fourth switches 116, 118 can be any type of electronic or electrical switch or relay that can be used for connecting and disconnecting electronic components. Third and fourth switches 116, 118 can be controlled using control hardware, firmware, software, any combination thereof, or any other type of control circuitry capable of actuating third and fourth switches 116, 118. Each of the first and second monitor access elements 150, 160 can be connected directly to third and fourth switches 116, 118, respectively. Alternatively, and as illustrated in FIG. 1, each of the first and second monitor access elements 150, 160 can be connected indirectly to third and fourth switches 116, 118, respectively, through a monitor bus 120. Monitor bus 120 can be any type of electrical bus or electrical connection for carrying electrical information between electronic components.

The conventional analog access arrangement to xDSL circuits can include one location common to, for example, 10,000 or any number of similar xDSL circuits. With 1000 to 10000 xDSL circuits, the common point can be, for example, the serving Central Office (CO). With 100 or less xDSL circuits, the access location can be, for example, at a Remote Terminal (RT) that operates as a distant extension of the serving CO. Consequently, monitor bus 120 (and the corresponding first and second monitor access elements 150, 160) can, for example, be localized and serve a multitude of impedance elements, such as first and second impedance elements 104, 106, connected to a collocated collection of circuit paths 102.

As shown in FIG. 1, first monitor access element 150 can be, for example, indirectly connected to the tip lead 101 through the monitor bus 120. Thus, according to exemplary embodiments, the output of monitor access element 150 can be, a buffered tip signal 134. Second monitor access element 160 can be, for example, indirectly connected to the ring lead 103 through the monitor bus 120. Thus, according to exemplary embodiments, the output of monitor access element 160 can be a buffered ring signal 136.

The system 100 can also include at least one communications circuit monitor. Each communications circuit monitor can be connected to a respective monitor access element. For example, the output of first monitor access element 150 can be connected to a first communications circuit monitor 138, while the output of second monitor access element 160 can be connected to a second communications circuit monitor 140, using any type of electrical connection capable of communicating electrical information. The at least one communications circuit monitor can be any type of electrical device that can be used for testing, evaluating or otherwise monitoring a communications circuit, such as a xDSL circuit.

First and second communications monitors 138, 140 can be located either locally or remotely to first and second monitor access elements 150, 160, respectively. If located locally, the electrical connection can be, for example, a wire, cable, or the like, or any other type of electrical connection capable of communicating electrical information. Additionally, the monitor access element can be located either internally or externally to the communications circuit monitor. If located remotely, the electrical connection can be, for example, a network connection, such as, for example, a cable, or any other type of electrical connection for communicating electrical information remotely. Thus, buffered tip signal 134 of the communications circuit can be monitored by first communications circuit monitor 138, and the buffered ring signal 136 can be monitored by second communications circuit monitor 140.

Although, as illustrated in FIG. 1, each buffered signal can be monitored by a separate communications circuit monitor, alternatively, the buffered signals can be monitored by a single communications circuit monitor that is capable of monitoring multiple signals concurrently. Alternatively, for example, for the purposes of some tests requiring consideration of both tip and ring voltages simultaneously, communication circuit monitors 138 and 140 can cooperate together to perform the tests.

According to exemplary embodiments, in an initial state, first switch 108 and second switch 110 are closed, while third switch 116 and fourth switch 118 are open. In this state, tip lead 101 and ring lead 103 are independently bridged to ground by the first and second impedance elements 104, 106. Thus, in the initial state, first and second impedance elements 104, 106 are connected to the communications circuit and switchably connected to first and second reference ground points 112, 114, respectively, while first and second monitor access elements 150, 160 are switchably disconnected from first and second impedance elements 104, 106, respectively. Initial adaptation and synchronization of the communication devices communicating across the communications circuit of circuit path 102 is accomplished. In the exemplary embodiment illustrated in FIG. 1, first and second impedance elements 104, 106 represent the "dummy" termination to the subject communications circuit.

To monitor the communications circuit, the at least one impedance element is switchably connected to the respective monitor access element and the at least one impedance element is switchably disconnected from the respective reference ground point, thereby connecting the at least one communications circuit monitor to the communications circuit without disrupting data communication within the communications circuit. According to exemplary embodiments, to monitor the communications circuit, third switch 116 and fourth switch 118 are closed to switchably connect first and second monitor access elements 150, 160 to first and second impedance elements 104, 106, respectively. As first and second switches 108, 110 being closed imposes a ground condition at the monitor switching points, third and fourth switches 116, 118 can be closed without causing a bridging impedance change on the communications circuit to be monitored. Then, first switch 108 and second switch 110 can be opened to switchably disconnect first and second impedance elements 104, 106 from first and second reference ground points 112, 114, respectively. Opening first and second switches 108, 110 results in no bridging impedance change, because first and second amplification elements 126, 128 provide the replacement virtual reference ground.

To remove the communications circuit monitor, the at least one impedance element is switchably re-connected to the respective at least one reference ground point and the at least one impedance element is switchably disconnected from the respective at least one monitor access element, thereby disconnecting the communications circuit monitor from the communications circuit without disrupting data communication within the communications circuit. The communications circuit monitor(s) can then be disconnected from the respective monitor access element(s), and, for example, connected to monitor access elements associated with other proximal circuit paths 102.

According to exemplary embodiments, to remove first and second communications circuit monitors 138, 140, first and second switches 108, 110 can be closed. Third and fourth switches 116, 118 can then be opened. Thus, the monitor circuitry can be introduced and removed with no detectable effect on the communications circuit bridging impedance, and, consequently, without detectable effect on information data flow between the communication devices (e.g., xDSL modems) communicating over the communications circuit along circuit path 102.

Figure 2:
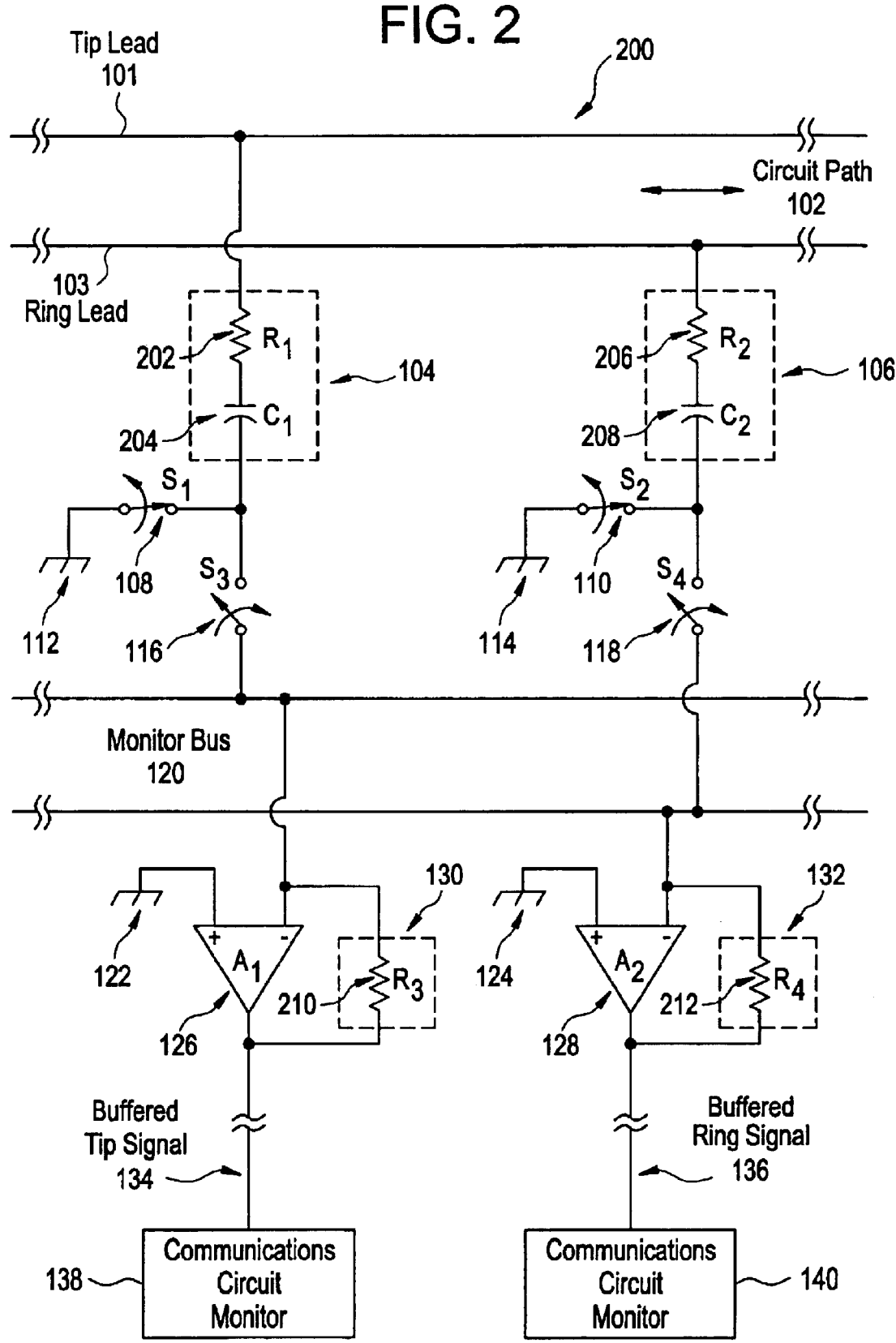
FIG. 2 is a diagram illustrating an exemplary embodiment of the system for hitless monitoring access of a communications circuit illustrated in FIG. 1, in accordance with an exemplary embodiment of the present invention.

According to exemplary embodiments, each impedance element connected to the communications circuit can include, for example, a resistance element (e.g., a resistor), a capacitance element (e.g., a capacitor), an inductance element (e.g., an inductor), or any other type of impedance element, in any combination thereof, in series or in parallel. FIG. 2 is a diagram illustrating an exemplary embodiment of the system for hitless monitoring access of a communications circuit illustrated in FIG. 1, in accordance with an exemplary embodiment of the present invention. In the exemplary embodiment illustrated in FIG. 2, each of the first and second impedance elements 104, 106 is comprised of a resistor and capacitor in series. However, other configurations for first and second impedance elements 104, 106 are possible. A first resistor 202 and a second resistor 206 can have values in the range of approximately 10 kΩ to approximately 100 kΩ, although other resistor values can be used. A first capacitor 204 and a second capacitor 208 can have values in the range of approximately 10 nF to approximately 100 nF, although other capacitive values can be used.

Although illustrated in FIG. 2 for first and second impedance elements 104, 106, the presence of first and second capacitors 204, 208 is not necessary. First and second capacitors 204, 208 can be included to avoid coupling of POTS (Plain Old Telephone Service) DC circuit supervision currents, and creating erroneous out-of-service POTS testing results by other equipment, in those applications where there is circuit shared between POTS and xDSL. In other words, first and second capacitors 204, 208 can be used to eliminate DC components in the monitor signal, and, additionally, through appropriate selection of value, to selectively reduce the influence of low frequency components.

In the exemplary embodiment illustrated in FIG. 2, each of the third and fourth impedance elements 130, 132 is comprised of a resistor. However, other configurations for third and fourth impedance elements 130, 132 are possible using different types of impedance elements, in different combinations, and in different orientations. The values of a third resistor 210 and a fourth resistor 212 can be selected for the desired overall gain of the first and second amplification elements 126, 128, respectively, and provide the negative feedback from the output of each amplification element to its respective negative input. Third and fourth resistors 210, 212 can have values of, for example, approximately 1 kΩ to produce an overall gain of approximately 0.1 to the buffered output points. However, other resistor values can be used for third and fourth resistors 210, 212, depending on the desired overall gain of the respective amplification elements.

Figure 3:
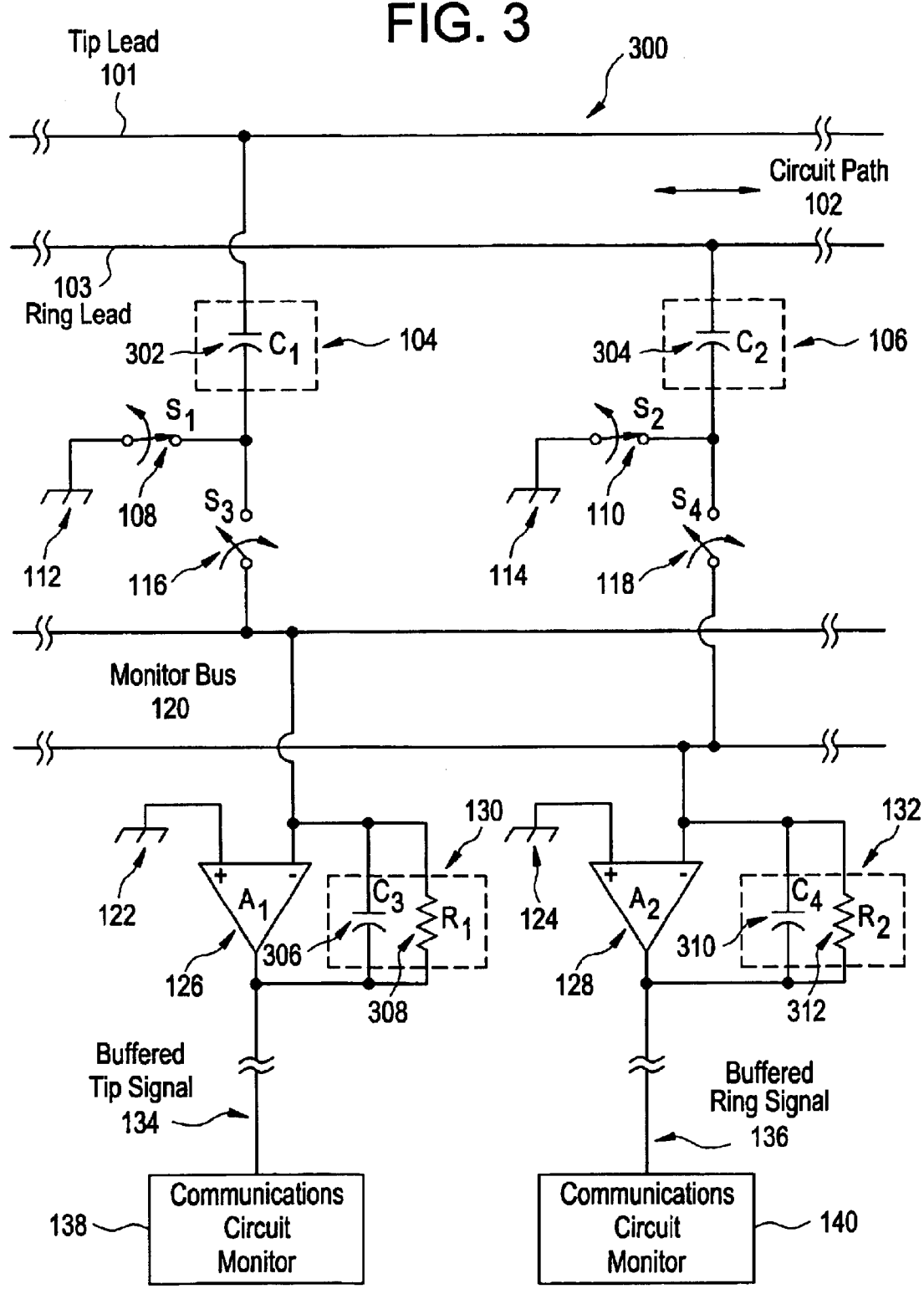
FIG. 3 is a diagram illustrating an alternative exemplary embodiment of the system for hitless monitoring access of a communications circuit illustrated in FIG. 1, in accordance with an exemplary embodiment of the present invention.

The additional impedance imposed on the communications circuit by first and second impedance elements 104, 106 can be, however, of any nature, configuration or value, of different types of impedance elements, in different combinations, and in different orientations. FIG. 3 is a diagram illustrating an alternative exemplary embodiment of the system for hitless monitoring access of a communications circuit illustrated in FIG. 1, in accordance with an exemplary embodiment of the present invention. For example, first and second impedance elements 104, 106 can be comprised of first and second capacitors 302, 304. First and second capacitors 302, 302 can have values in the range of approximately 10 nF to approximately 100 nF, although other capacitive values can be used. Third and fourth impedance elements 130, 132 can each be comprised of, for example, a capacitor and resistor in parallel. In the exemplary configuration illustrated in FIG. 3, third and fourth capacitors 306, 310 are the primary feedback elements. The values of the third and fourth capacitors 306, 310 can be selected for the desired overall gain of the first and second amplification elements 126, 128, respectively, and provide the negative feedback from the output of each amplification element to its respective negative input. First and second resistors 308, 312 can be added, for example, for amplifier stability and reduction in the influence of low frequency components. However, other configurations of impedance elements for first, second, third and fourth impedance elements 104, 106, 130, 132, respectively, are possible.

The additional impedance imposed on the communications circuit by first and second impedance elements 104, 106 can be of any nature, configuration or value. According to exemplary embodiments, the impedance should be chosen, however, so that the perturbation so created on an otherwise uniform transmission medium (e.g., a twisted pair) of the communications circuit of circuit path 102 is within the adaptation range of the employed communication devices, and, consequently, the communication circuit's reach, speed, error rate and the like are not materially impaired. In addition, the impedance selected for first and second impedance elements 104, 106 can be replicated, to within a scalar constant, and utilized for third and fourth impedance elements 130, 132 to insure the fidelity of the monitor signal, if desired. For the balanced circuits of FIGS. 1, 2 and 3, perturbations should be imposed symmetrically to avoid exacerbating the ingress and egress of external electromagnetic effects. Thus, first and second impedance elements 104, 106 can be chosen to be substantially identical to ensure, for example, imposition of symmetrical perturbations on the communications circuit. However, exemplary embodiments of the present invention can also be used with unbalanced circuits.

Figure 4:
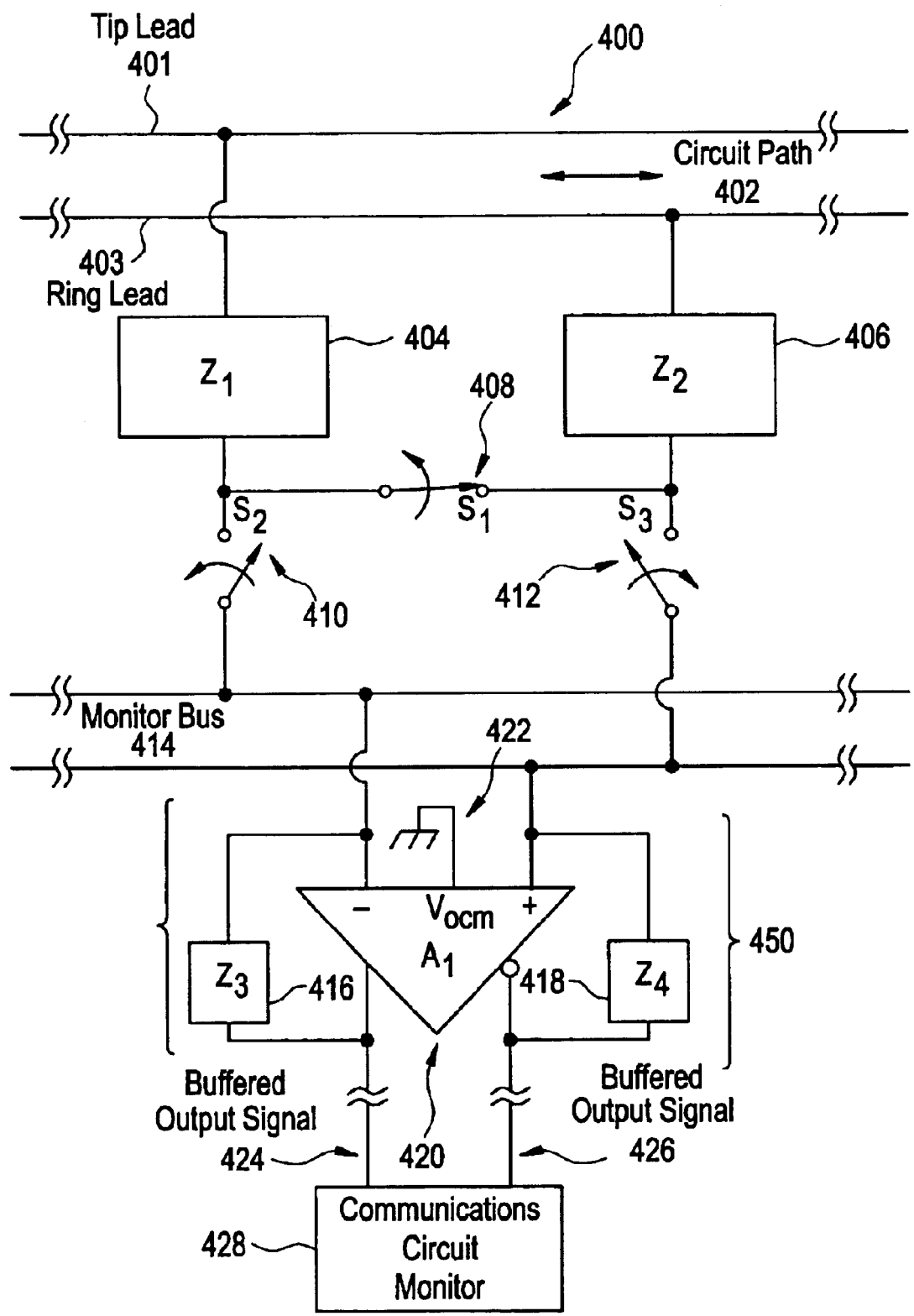
FIG. 4 is a diagram illustrating a system for hitless monitoring access of a communications circuit, in accordance with an alternative exemplary embodiment of the present invention.

An alternative configuration of a system for monitoring a communications circuit is illustrated in FIG. 4. FIG. 4 is a diagram illustrating a system 400 for hitless monitoring access of a communications circuit, in accordance with an alternative exemplary embodiment of the present invention. The system 400 includes a first impedance element 404 connected to a first communications circuit line (e.g., tip lead 401) of the communications circuit (e.g., along circuit path 402), when the communications circuit is established. The system 400 also includes a second impedance element 406 connected to a second communications circuit line (e.g., ring lead 403) of the communications circuit when the communications circuit is established.

According to this alternative exemplary embodiment, the first and second impedance elements 404, 406 can be switchably connected to form a differential impedance across the communications circuit. For example, first switch 408 can be used to switchably connect the first and second impedance elements 404, 406 to form the differential impedance. The first switch 408 can be any type of electronic or electrical switch or relay that can be used for connecting and disconnecting electronic components. First switch 408 can be controlled using control hardware, firmware, software, any combination thereof, or any other type of control circuitry capable of actuating first switch 408. In the system 400, first switch 408 can serve to electrically connect the "dummy" termination of first and second impedance elements 404, 406 differentially between tip lead 401 and ring lead 403.

Once connected to the communications circuit lines, the differential impedance formed by the first and second impedance elements 404, 406 causes the communication devices communicating via the communications circuit to substantially permanently adapt to the presence of the differential impedance. In other words, communication devices (e.g., xDSL modems) communicating over the communications circuit along circuit path 402 can adapt to the presence of the differential impedance load imposed by first and second impedance elements 404, 406 when communication is being established between the communication devices.

The system 400 can also include a monitor access element 450. The first and second impedance elements 404, 406 can be switchably disconnected from the monitor access element. For example, second switch 410 and third switch 412 can be used to switchably connect and disconnect the monitor access element 450 to and from the first and second impedance elements 404, 406. The second and third switches 410, 412 can be any type of electronic or electrical switch or relay that can be used for connecting and disconnecting electronic components. Second and third switches 410, 412 can be controlled using control hardware, firmware, software, any combination thereof, or any other type of control circuitry capable of actuating second and third switches 410, 412.

The monitor access element 450 can be directly connected to second and third switches 410, 412. Alternatively, and as illustrated in FIG. 4, the respective leads of the monitor access element 450 can be indirectly connected through a monitor bus 414 to the second and third switches 410, 412 and, thereby, to first and second impedance elements 404, 406. Monitor bus 414 can be any type of electrical bus or electrical connection for carrying electrical information between electronic components.

According to exemplary embodiments, the monitor access element 450 can be configured to be a virtual differential zero impedance. According to this exemplary embodiment, the monitor access element 450 can comprise a differential amplification element 420. The monitor access element 450 can include an impedance element, such as third impedance element 416 and fourth impedance element 418. In a differential amplifier configuration, amplification element 420 includes two outputs, one of which is the inverse of the other relative to ancillary differential amplifier input $V_{ocm}$. One output (the non-inverted output) is fed back through third impedance element 416 to the negative input of amplification element 420. The other output (the inverted output) is fed back through fourth impedance element 418 to the positive input of the amplification element 420. The output common mode voltage, $V_{ocm}$, is essentially a third input on the differential amplification element 420 that defines the common mode voltage of the outputs. Generally, the $V_{ocm}$ pin can be connected to the center or reference voltage of, for example, the op-amp power supplies. However, according to exemplary embodiments, $V_{ocm}$ can be connected to a reference ground 422. Consequently, with no input, the two output voltages of the differential amplification element 420 will be equal in amplitude, and equal to $V_{ocm}$. With input present, the outputs will deflect in symmetrically opposite directions relative to $V_{ocm}$.

Figure 5:
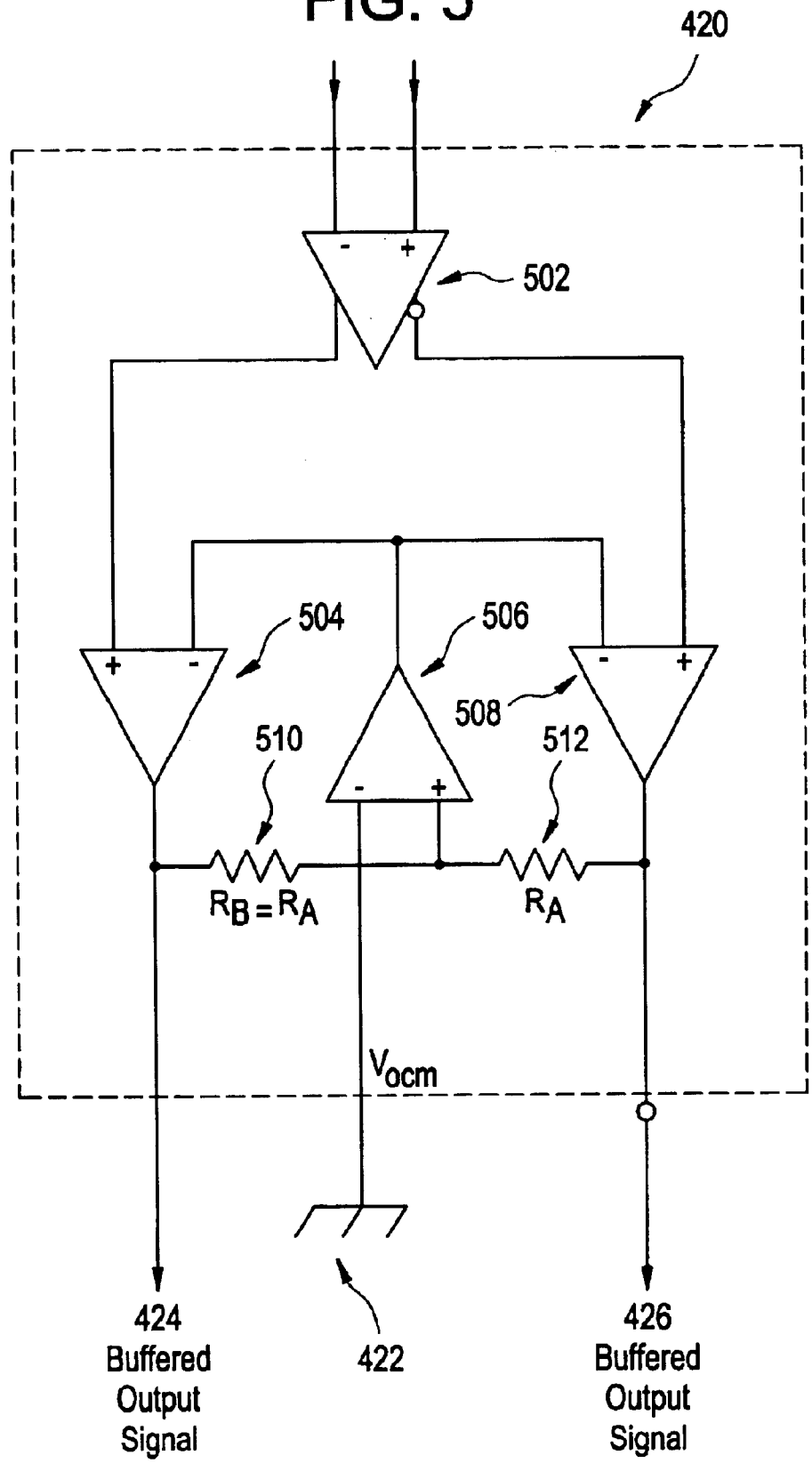
FIG. 5 is a diagram illustrating an exemplary internal equivalent of a differential operational amplifier illustrated in FIG. 4, in accordance with an exemplary embodiment of the present invention.

A differential amplifier, such as differential amplification element 420, is very similar to a standard, single-ended op amp, except that output is taken from both sides of the internal input differential transistor pair to produce a differential output. FIG. 5 is a diagram illustrating an exemplary internal equivalent of a differential operational amplifier illustrated in FIG. 4, in accordance with an exemplary embodiment of the present invention. As illustrated in FIG. 5, the differential amplification element 420 can be comprised of op-amps 502, 504, 506, 508. The input to the negative input terminal of op-amp 502 can be directly or indirectly connected to, for example, the tip lead 401, while the input to the positive input terminal of op-amp 502 can be directly or indirectly connected to, for example, the ring lead 403. The non-inverted output of op-amp 502 can form the input to the positive input terminal of op-amp 504, while the inverted output of op-amp 502 can form the input to the positive input terminal of op-amp 508. The output of op-amps 504 and 508 can be connected to each other through resistors 510 and 512 to form the input to the positive input terminal of op-amp 506. Resistors 510 and 512 can be chosen to be substantially identical to maintain symmetrical feedback in order to maintain an average of the two output voltages equal to $V_{ocm}$. The negative input terminal of op-amp 506 can be connected to reference ground 422 as $V_{ocm}$. The output of op-amp 506 can form the input to each of the negative input terminals of op-amps 504 and 508. In such a configuration, the output of op-amp 504 can form the buffered output signal 424, while the output of op-amp 508 can form the buffered output signal 426. Any suitable integrated circuit differential op-amp can be used for differential amplification element 420, such as, for example, an AD8132 offered by Analog Devices of Norwood, Mass.

Referring again to FIG. 4, the system 400 can also include a communications circuit monitor 428. The communications circuit monitor can be connected to the monitor access element. For example, the communications circuit monitor 428 can be connected to both the buffered output signal 424 and the buffered output signal 426, that are output by the monitor access element 450. According to the present exemplary embodiment, buffered output signal 424 and buffered output signal 426 comprise equal and opposite voltage signals (equal in amplitude, but opposite in polarity) representing the difference between the actual tip and ring voltages (i.e., the differential tip-to-ring voltage), resulting from connecting the common mode output voltage pin ($V_{ocm}$) of differential amplification element 420 to reference ground 422. In other words, the average, or common mode, value of the tip and ring voltages can be replaced by the voltage value established at ancillary differential amplifier input $V_{ocm}$.

Although illustrated in FIG. 4 as a single communications circuit monitor connected to both buffered output signals, each of the buffered output signals (although of equal amplitude, but opposite polarity) can be connected to a separate communications circuit monitor. The communications circuit monitor 428 can be any type of electrical device that can be used for testing, evaluating or otherwise monitoring a communications circuit, such as a xDSL circuit.

The communications circuit monitor 428 can be located either locally or remotely to the monitor access element 450. If located locally, the electrical connection can be, for example, a wire, cable, or the like or any other type of electrical connection capable of communicating electrical information. Additionally, the monitor access element 450 can be located either internally or externally to the communications circuit monitor 428. If located remotely, the electrical connection can be, for example, a network connection, such as, for example, a cable, or any other type of electrical connection capable of communicating electrical information remotely.

According to exemplary embodiments, in an initial state, first switch 408 is closed, while second switch 410 and third switch 412 are open. In this state, tip lead 401 and ring lead 403 are bridged by the differential impedance formed by first and second impedance elements 404, 406. Thus, in the initial state, first and second impedance elements 404, 406 are connected to the communications circuit and switchably connected to each other, while monitor access element 450 is switchably disconnected from first and second impedance elements 404, 406. Initial adaptation and synchronization of the communication devices communicating across the communications circuit of circuit path 402 is accomplished. In the exemplary embodiment illustrated in FIG. 4, first and second impedance elements 404, 406 represent the "dummy" termination to the subject communications circuit.

To monitor the communications circuit, the first and second impedance elements can be switchably connected to the monitor access element, and the first impedance element can be switchably disconnected from the second impedance element, thereby connecting the communications circuit monitor to the communications circuit without disrupting data communication within the communications circuit. According to exemplary embodiments, to monitor the communications circuit, second switch 410 and third switch 412 are closed to switchably connect monitor access element 450 to first and second impedance elements 404, 406. As the voltages induced on tip and ring leads 401, 403 by the communication devices should be equal in amplitude, but opposite in polarity, from the point of view of the communication devices, the differential impedance formed by first and second impedance elements 404, 406 is established through the closure of first switch 408 between the first and second impedance elements 404, 406. Second and third switches 410, 412 can be closed without causing a differential impedance change on the communications circuit to be monitored, since this action connects differential amplification element 420 via monitor bus 414 across closed first switch 408. Then, first switch 408 can be opened to switchably disconnect first and second impedance elements 404, 406 from each other. Opening first switch 408 results in no differential impedance change, because the monitor access element 450, with differential amplification element 420 and third and fourth impedance elements 416, 418, provides the replacement virtual differential zero impedance, originally established through the closure of first switch 408.

To remove the communications circuit monitor, the first impedance element 404 can be switchably re-connected to the second impedance element 406, and the first and second impedance elements 404, 406 can be switchably disconnected from the monitor access element 450, thereby disconnecting the communications circuit monitor 428 from the communications circuit without disrupting data communication within the communications circuit. The communications circuit monitor(s) can then be disconnected from the respective monitor access element(s), and, for example, connected to monitor access elements located on other proximal circuit paths 402.

According to exemplary embodiments, to remove communications circuit monitor 428, first switch 408 can be closed. Second and third switches 410, 412 can then be opened. Thus, the monitor circuitry can be introduced and removed with no detectable effect on the communications circuit differential impedance, and, consequently, without detectable effect on information data flow between the communication devices (e.g., xDSL modems) communicating over the communications circuit along circuit path 402.

Figure 6:
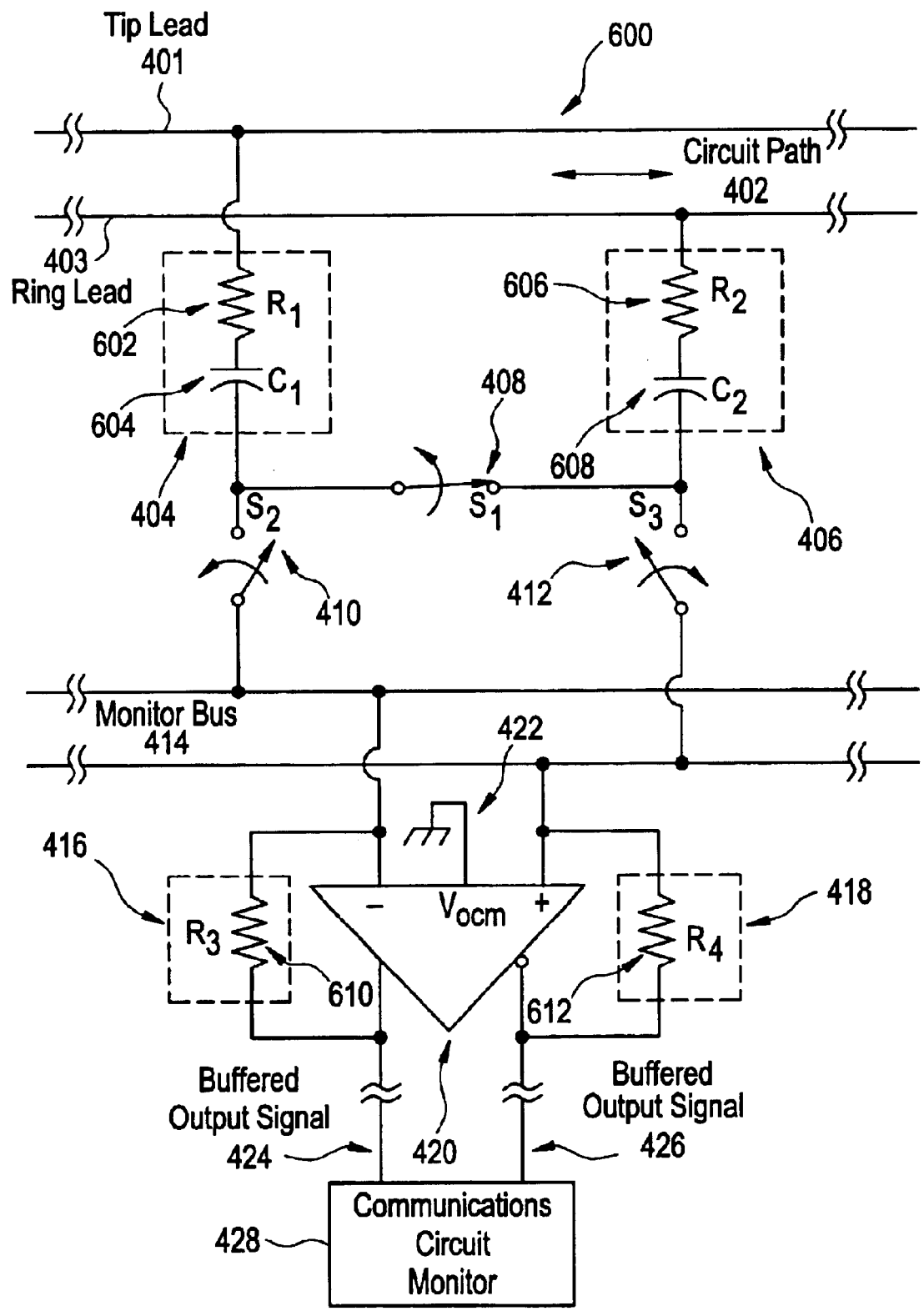
FIG. 6 is a diagram illustrating an exemplary embodiment of the system for hitless monitoring access of a communications circuit illustrated in FIG. 4, in accordance with an exemplary embodiment of the present invention.

According to exemplary embodiments, each impedance element connected to the communications circuit can include, for example, a resistance element (e.g., a resistor), a capacitance element (e.g., a capacitor), an inductance element (e.g., an inductor), or any other type of impedance element, in any combination thereof, in series or in parallel. The additional differential impedance imposed on the communications circuit by first and second impedance elements 404, 406 can be any type of impedance element, in any desired configuration, combination or orientation, using any desired values. FIG. 6 is a diagram illustrating an exemplary embodiment of the system for hitless monitoring access of a communications circuit illustrated in FIG. 4, in accordance with an exemplary embodiment of the present invention. In the exemplary embodiment illustrated in FIG. 6, each of the first and second impedance elements 404, 406 are comprised of a resistor and capacitor in series. However, other configurations for first and second impedance elements 404, 406 are possible. A first resistor 602 and a second resistor 606 can be chosen to have substantially identical values in the range of approximately 10 kΩ to approximately 100 kΩ, although other resistor values can be used. A first capacitor 604 and a second capacitor 608 can be chosen to have substantially identical values in the range of approximately 10 nF to approximately 100 nF, although other capacitive values can be used.

Although illustrated in FIG. 6 for first and second impedance elements 404, 406, the presence of first and second capacitors 604, 608 is not necessary. First and second capacitors 604, 608 can be included to avoid coupling of POTS (Plain Old Telephone Service) DC circuit supervision currents, and creating erroneous out-of-service POTS testing results by other equipment, in those applications where there is circuit sharing between POTS and xDSL. In other words, first and second capacitors 604, 608 can be used to eliminate DC components in the monitor signal, and, additionally, through appropriate selection of value, to selectively reduce the influence of low frequency components.

In the exemplary embodiment illustrated in FIG. 6, each of the third and fourth impedance elements 416, 418 are comprised of a resistor, e.g., third resistor 610 and fourth resistor 612, respectively. However, other configurations for third and fourth impedance elements 416, 418 are possible. The values of a third resistor 610 and a fourth resistor 612 can be selected for the desired overall gain of the differential amplification element 420, and provide the appropriate feedback from the outputs of the differential amplification element 420 to its respective inputs. Third and fourth resistors 610, 612 can have any substantially identical values that can be chosen to produce the desired overall gain of the differential amplification element 420 to the buffered output points.

Figure 6A:
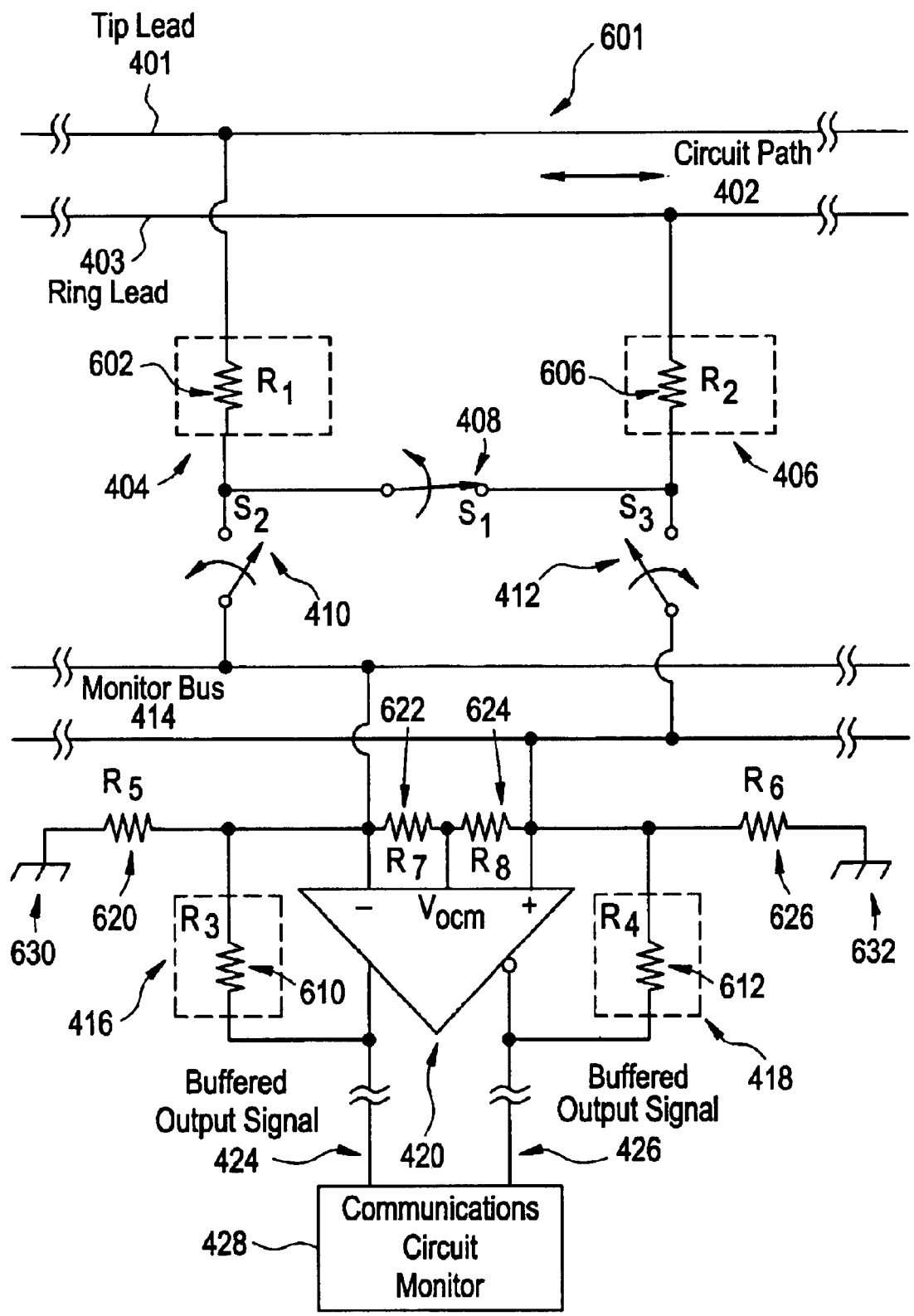
FIG. 6A is a diagram illustrating an alternative exemplary embodiment of the system for hitless monitoring access of a communications circuit illustrated in FIG. 4, in accordance with an alternative exemplary embodiment of the present invention.

FIG. 6A is a diagram illustrating an alternative exemplary embodiment of the system for hitless monitoring access of a communications circuit illustrated in FIG. 4, in accordance with an alternative exemplary embodiment of the present invention. In the system 601 illustrated in FIG. 6A, each of the first, second, third and fourth impedance elements 404, 406, 416, 418, respectively, can be comprised of a resistor. However, other configurations for first, second, third and fourth impedance elements 404, 406, 416, 418, respectively, are possible. The system 601 also includes fifth, sixth, seventh, and eight resistors 620, 622, 624, 626, respectively. Seventh and eight resistors 622, 624 can each be connected to ancillary differential amplifier input $V_{ocm}$ of differential amplification element 420, with seventh resistor 622 also connected to the negative input of differential amplification element 420 and eighth resistor 624 also connected to the positive input of differential amplification element 420. Fifth resistor 620 can be connected to the negative input of differential amplification element 420 and to a ground point 630. Sixth resistor 626 can be connected to the positive input of differential amplification element 420 and to a ground point 632.

In system 601 of FIG. 6A, there is an absence of capacitors in first and second impedance elements 404, 406. Consequently, the response of the buffered output signals 424, 426 can include DC and low-frequency components of the tip and ring voltages, without frequency-dependent weighting. In the present alternative exemplary embodiment, if the values of fifth and sixth resistors 620, 626 are chosen to be sufficiently large, and if the value of seventh resistor 622 is chosen to be substantially equal to the value of eighth resistor 624, then the common mode voltage (i.e., the average of the tip and ring voltages) of the buffered output signals 424 and 426 can be equal to the common mode voltage of the monitored tip and ring leads (i.e., the average of the tip and ring voltages).

More specifically, let $$V_d = V_{ring} - V_{tip}$$

$$V_c = \frac{V_{ring} + V_{tip}}{2}.$$

If $R_1=R_2$, $R_3=R_4$, $R_5=R_6$ and $R_7=R_8$, let $$\alpha = \frac{R_5}{R_1 + R_5}$$

$$\beta = \frac{R_3}{R_1}.$$

Then, buffered output signal 424 can be represented by the following equation:

$$\alpha V_c + \frac{\beta}{2} V_d \quad (1)$$

and buffered output signal 426 can be represented by the following equation:

$$\alpha V_c - \frac{\beta}{2} V_d \quad (2)$$

Thus, buffered output signals 424 and 426 have equal common mode components, and equal amplitude but opposite polarity differential mode components. The alternative exemplary embodiment illustrated in FIG. 6A can provide the capability to separately adjust the common mode gain (i.e., α) and the differential gain (i.e., β) of the monitor access element 450. However, the various resistors illustrated in FIG. 6A can be replaced with a more complicated arrangement of multiple components to achieve other desirable complex and frequency-dependent impedances, resulting in complex and frequency-dependent gain ratios α and β.

As a practical telecommunication circuit consideration, the common mode voltages (relative to the intended transmission mode of differential voltages) can often be high and, therefore, undesirable. Typically, xDSL voltages can be in the range of approximately 1 volt to approximately 10 volts, whereas the unintended common mode voltages can be in the range of approximately 1 volt to approximately 100 volts, typically comprised of approximately 1 volt to approximately 10 volts of DC with the substantial remainder being composed of the fundamental and lower-order harmonics of the local power grid frequency (i.e., 60 Hz, 120 Hz, 180 Hz, 240 Hz, and the like). Consequently, for the alternative exemplary embodiment illustrated in FIG. 6A, fifth and sixth resistors 620, 626 can be added to allow the common mode gain of the differential amplification element 420 to be set suitably less than unity. Otherwise, the output voltage extreme values of differential amplification element 420 would need to match or exceed the common mode voltages found on the communications circuit 402. In turn, then, the supply voltages for differential amplification element 420 would also need to exceed these values to avoid distortion of the buffered output signals 424, 426.

Figure 7:
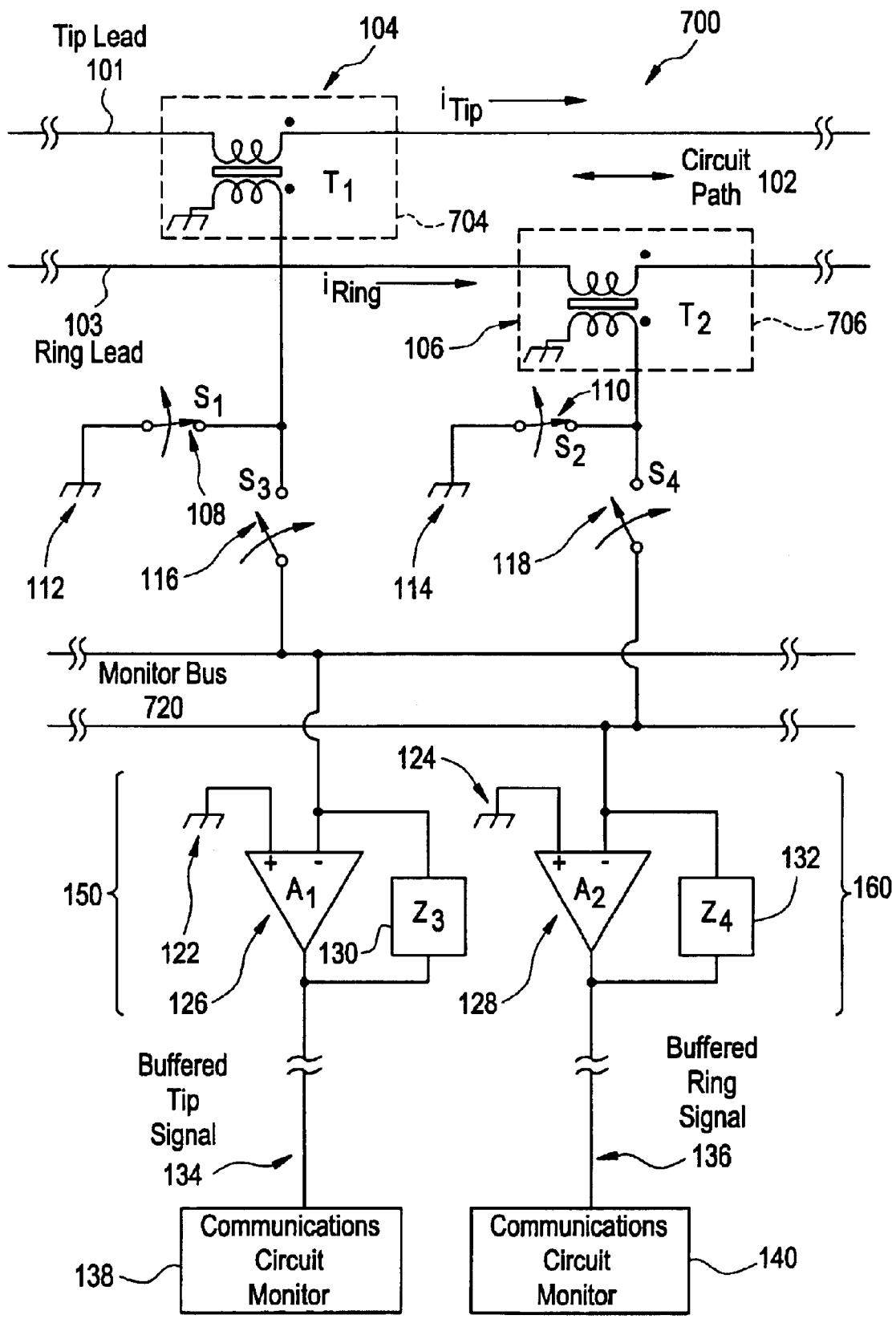
FIG. 7 is a diagram illustrating a system for hitless monitoring access of a communications circuit, in accordance with an alternative exemplary embodiment of the present invention.

Those of ordinary skill in the art will recognize that configurations other than those illustrated in FIGS. 1, 2, 3, 4, 6 and 6A are possible according to exemplary embodiments of the HMA technique. For example, FIG. 7 is a diagram illustrating an exemplary embodiment of the system for hitless monitoring access of a communications circuit illustrated in FIG. 1, in accordance with an alternative exemplary embodiment of the present invention. In the alternative exemplary embodiment illustrated in FIG. 7, the first and second impedance elements 104, 106 are comprised of a first transformer 704 and a second transformer 706, respectively. System 700 of FIG. 7 can be used, for example, to monitor the tip current, $i_{tip}$, of tip lead 101 (output as buffered tip current signal 134) and the ring current, $i_{ring}$, of ring lead 103 (output as buffered ring current signal 136) of circuit path 102. The system 700 can be used alone or in combination with any other circuit monitoring configurations according to exemplary embodiments, such as those illustrated in FIGS. 1, 2, 3, 4, 6 and 6A, to monitor the circuit characteristics of circuit path 102. According to the present alternative exemplary embodiment, the monitor bus 720 can be used as a current monitor bus to monitor the aforementioned currents. The monitor bus 720 can be a separate bus from or the same bus as monitor bus 120 of FIG. 1, with monitor bus 120 acting as, for example, a voltage monitor bus to allow monitoring of the tip and ring voltages along circuit path 102.

First and second transformers 704, 706 can be operated as current transformers, in that the first and second transformers 704, 706 can be terminated in a virtual or actual zero impedance according to exemplary embodiments. Thus, according to exemplary embodiments, first and second transformers 704, 706 introduce no inductance in the circuit path 102. Even if non-ideal transformer leakage inductance is present in first and second transformers 704 and 706, the leakage inductance can be adapted to during the initial adaptation of the communication devices communicating via the circuit path 102. According to exemplary embodiments, once adapted to, no additional perturbations are introduced, regardless of the presence of a monitoring device to monitor, for example, the tip and ring lead currents.

Figure 7A:
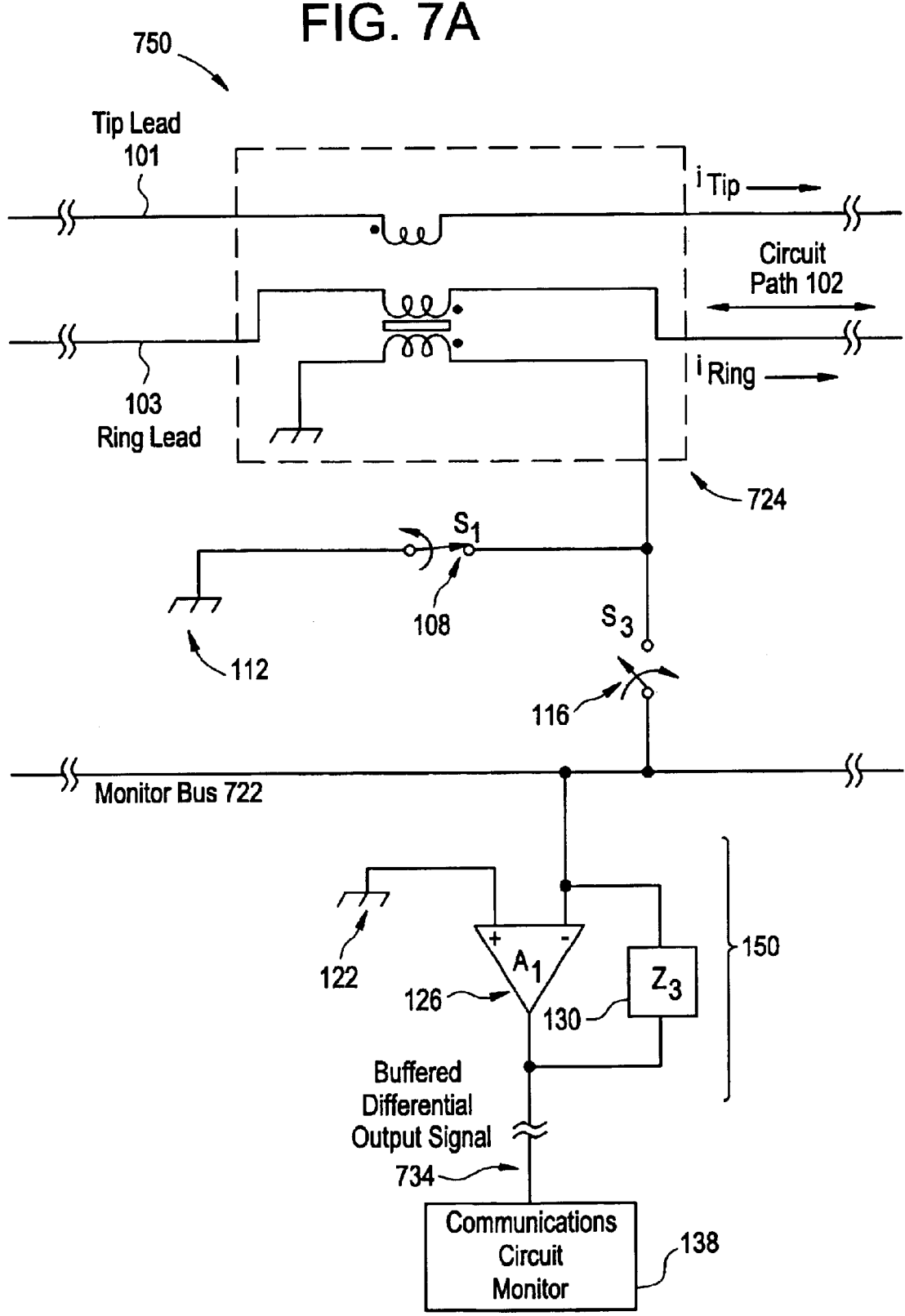
FIG. 7A is a diagram illustrating an exemplary embodiment of the system for hitless monitoring access of a communications circuit illustrated in FIGS. 4 and 7, in accordance with an alternative exemplary embodiment of the present invention.

Alternatively, FIG. 7A is a diagram illustrating an exemplary embodiment of the system for hitless monitoring access of a communications circuit illustrated in FIGS. 4 and 7, in accordance with an alternative exemplary embodiment of the present invention. In FIG. 7A, system 750 can be used for taking a differential current measurement between tip lead 101 and ring lead. In contrast to the system illustrated in FIG. 4, even though a differential current measurement can be taken, a differential amplifier, such as, for example, differential amplification element 420, is not required, because of the isolation provided by the current-sensing transformer 724. Thus, in the alternative exemplary embodiment illustrated in FIG. 7A, the first and second impedance elements 404 and 406 of FIG. 4 can be comprised of a single transformer 724 connected to both tip lead 101 and ring lead 103. System 750 of FIG. 7A can be used, for example, to monitor the difference between the tip current, $i_{tip}$, of tip lead 101 and the ring current, $i_{ring}$, of ring lead 103 of circuit path 102.

Although the monitor access element 150 can be similar to that illustrated in FIG. 1, the output of the monitor access element 150 illustrated in FIG. 7A is a buffered differential output signal 734 representing the difference between $i_{tip}$ and $i_{ring}$. According to the present alternative exemplary embodiment, the monitor bus 722 can be used as a differential current monitor bus to monitor the aforementioned differential current. Since a single transformer 724 can be used in the present alternative exemplary embodiment to monitor the differential current, an arrangement of switches similar to that of, for example, FIG. 1 can be used. For example, with first switch 108 closed and third switch 116 open, third switch 116 can be closed and first switch 108 can be opened to allow communications circuit monitor 138 to monitor the buffered differential output signal 734. Then, first switch 108 can be closed and third switch 116 can be opened to allow for removal of the communications circuit monitor 138.

Figure 7B:
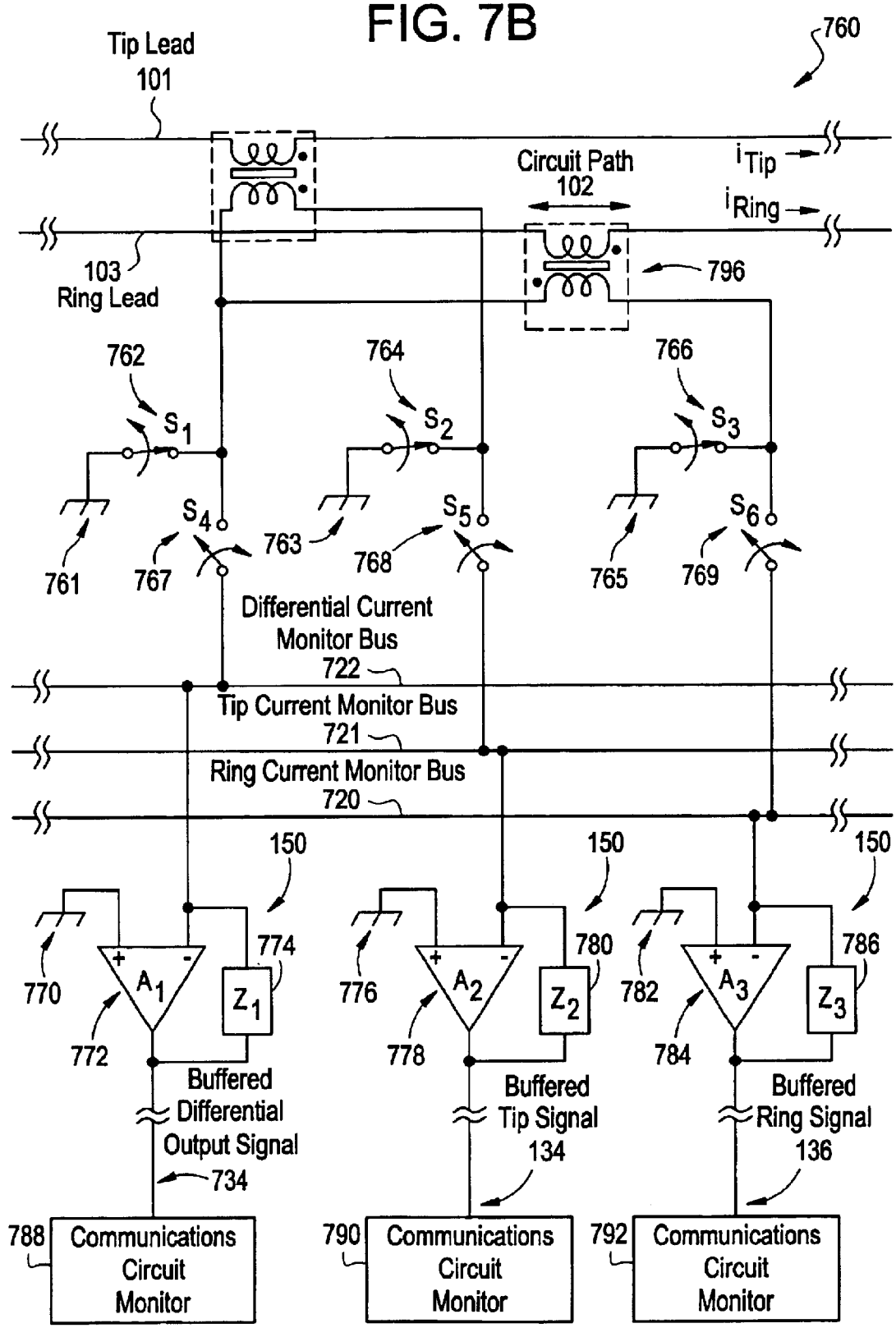
FIG. 7B is a diagram illustrating an exemplary embodiment of the system for hitless monitoring access of a communications circuit illustrated in FIGS. 7 and 7A, in accordance with an alternative exemplary embodiment of the present invention.

The system 750 can be used alone or in combination with any other circuit monitoring configurations according to exemplary embodiments, such as those illustrated in FIGS. 1, 2, 3, 4, 6, 6A and 7, to monitor the circuit characteristics of circuit path 102. For example, FIG. 7B is a diagram illustrating an exemplary embodiment of the system for hitless monitoring access of a communications circuit illustrated in FIGS. 7 and 7A, in accordance with an alternative exemplary embodiment of the present invention. In FIG. 7B, the system 760 can be used to take independent tip lead 101 and ring lead 103 current measurements, such as that performed according to system 700 of FIG. 7, as well as a differential current measurement, such as that performed according to FIG. 7A.

As illustrated in FIG. 7B, the grounded secondary leads of a tip lead transformer 794 and a ring lead transformer 796 can be used for performing both the individual and differential current measurements. The individual and differential current measurements can be performed separately in time or simultaneously, if desired. To perform the differential current measurement, fourth switch 767 can be closed and first switch 762 can be opened, with the differential current signal being output as buffered differential output signal 734. The process can be reversed to allow removal of the communications circuit monitor 788. The tip and ring lead current measurements can be performed by closing fifth switch 768 and sixth switch 769 and opening second switch 764 and third switch 766, with the respective current signals being output as buffered tip signal 134 and buffered ring signal 136, respectively. The process can be reversed to allow removal of the respective communications circuit monitors 790 and 792. In the alternative exemplary embodiment illustrated in FIG. 7B, multiple monitor buses can be used to monitor the various currents signals, such as differential current monitor bus 722, tip current monitor bus 721, and ring current monitor bus 720.

It should be noted that, in FIG. 7B, the sign of the buffered ring signal 136 is numerically reversed. The ring lead transformer 796 can be polarized oppositely from the tip lead transformer 794 by connecting one each of the secondary leads of both transformers together, so that the simple sum of the sensed currents presented to the negative input of first amplification element 772 is representative of the difference of the tip lead 101 and ring lead 103 currents. The opposing connection causes the inversion of the sign of the individual ring current signal, as presented to the third amplification element 784, relative to the individual tip current signal, as presented to the second amplification element 778. However, restoration of the relative polarities of the individual tip and ring signals can be accomplished, for example, numerically during monitor data analysis, through the use of an inverting amplifier stage, or the like.

With knowledge of both the lead currents and the lead voltages according to exemplary embodiments of the present invention, the modem signals can be separated from each end of the circuit path 102. In other words, with knowledge of the circuit impedances (e.g., the characteristic impedance of the transmission medium, such as, for example, a twisted pair), and measuring the individual lead voltages and currents, the individual modem signals from opposite ends of the communications circuit can be separated hitlessly, even though the signals are impressed simultaneously as differential signals on a single pair, forming what is known as a directional coupler.

Figure 7C:
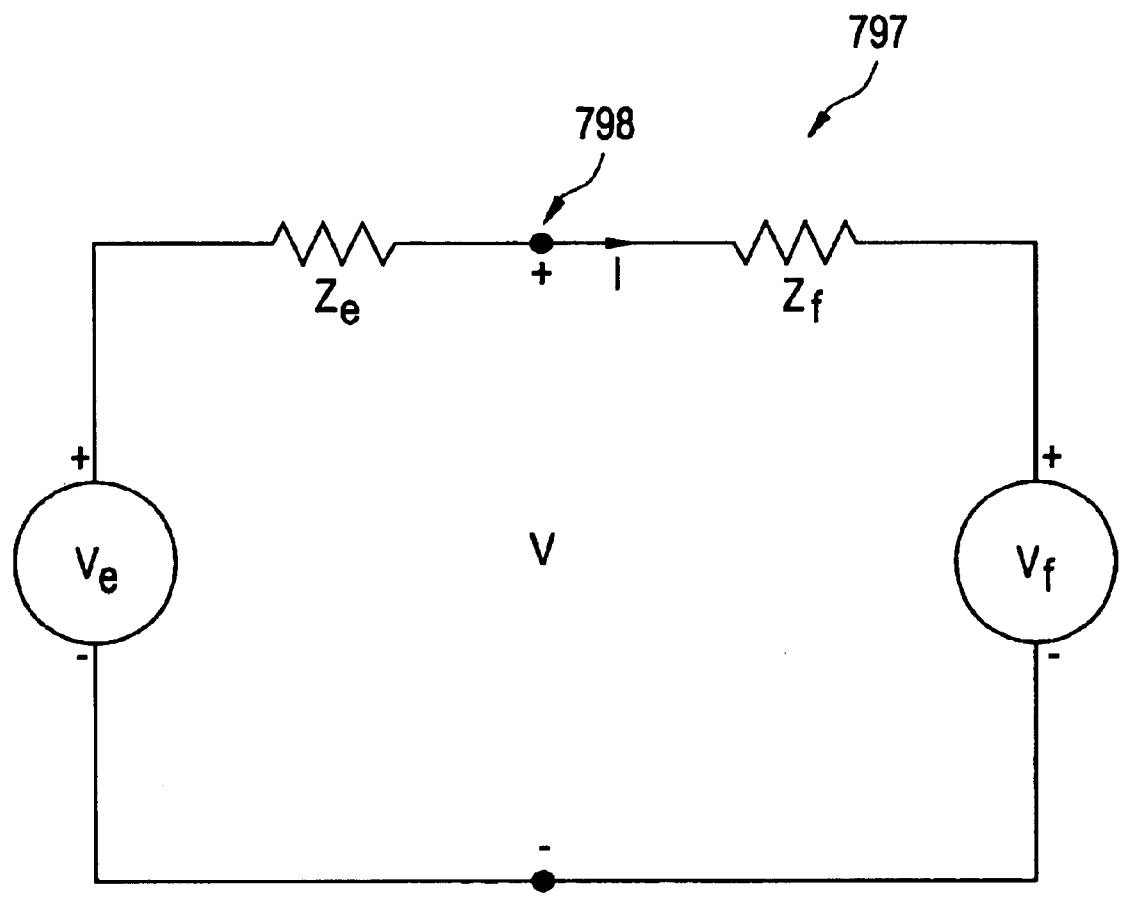
FIG. 7C is a diagram illustrating an equivalent circuit model of modems and the circuit path through which they communicate from an observation point, in accordance with an exemplary embodiment of the present invention.

For a balanced twisted pair circuit, the differential signals are of interest, i.e., the voltage difference and the current different between the tip and ring leads. However, an incidental common mode signal path also exists relative to ground. In the present illustration, the difference of the lead voltages and the difference of the lead currents can be considered. FIG. 7C is a diagram illustrating an equivalent circuit model 797 of modems and the circuit path through which they communicate from an observation point, in accordance with an exemplary embodiment of the present invention. For circuit model 797, the voltage V and the current I can be measured at the same circuit observation point 798. Specifically, for the differential mode, $V=V_{tip}-V_{ring}$ and $I=I_{tip}-I_{ring}$. In FIG. 7C, $V_e$ denotes the signal that the first modem (e.g., the modem in the equipment direction, toward the CO or RT) is sending, $V_f$ represents the signal the second modem (e.g., the modem in the facility direction, toward the subscriber) is sending, $Z_e$ denotes the circuit impedance at the observation point 798 in the equipment direction (e.g., toward the CO or RT), and $Z_f$ represents the circuit impedance at the observation point 798 in the facility direction (e.g., toward the subscriber). Consequently, $$V = \frac{Z_f V_e + Z_e V_f}{Z_e + Z_f} \quad (3)$$

and $$I = \frac{V_e - V_f}{Z_e + Z_f} \quad (4)$$

Solving for $V_e$ and $V_f$ in Equations (3) and (4) after measuring V and I at the observation point 798, results in the following directional coupler Equations (5) and (6):

$$V_e = V + Z_e I \quad (5)$$

and $$V_f = V - Z_f I \quad (6)$$

For Equations (5) and (6), $Z_e$ and $Z_f$ should be known a priori to effectively separate the two modem signals at the observation point 798. For xDSL frequencies of operation, the impedance values (approaching an asymptotic value of approximately 100 Ω real above 100 kHz) are more easily established than throughout the voice frequencies. Nonetheless, modem termination impedance variations, as well as circuit path irregularities, can result in enough circuit-to-circuit variation in the values of $Z_e$ and $Z_f$ to make it difficult to achieve consistently more than 20 dB of rejection of the undesired modem signal, without actual measurement of the particular impedance values on a circuit-by-circuit basis. In other words, because the circuit impedances are not know precisely a priori, rejection of the unwanted modem should not be expected to be better than 20 dB. However, if the xDSL signal type is known, or can be searched for heuristically, the assumed circuit impedance value in each direction can be slowly altered relative to the observation point 798 over time, so as to improve the coupler process directivity. Assuming monitor attachment is accomplished at some time after the communicating modems have synchronized and trained, directivity improvement can be driven by the measurement of the signal-to-noise ratio of at least one pilot tone bit sequence, or other known overhead bit pattern, from at least one modem, and iteratively optimizing this value through adjustment of initially assumed circuit impedances. Alternatively, if the xDSL signals are separable in the frequency domain, as, for example, is the case for currently deployed ADSL, total energy present in the transmitted spectrum from the direction of the unwanted modem can be iteratively minimized. Consequently, exemplary embodiments of the present invention can be used to hitlessly separate the individual modem signals from opposite ends of a communications circuit.

Thus, exemplary embodiments of the present invention can be used to hitlessly monitor circuit characteristics such as, for example, individual lead voltage to ground, differential lead voltage, common mode lead voltage, individual lead current using a current transformer, individual lead current using a differential amplifier, common mode lead currents using a current transformer, differential lead current using a current transformer, or any other desired circuit characteristic of circuit path 102, depending on the configuration of exemplary embodiments used, without disturbing data communication between communication devices communicating via circuit path 102.

According to the HMA technique, an otherwise potentially disturbing monitor access can be applied to a communications circuit by substitution of a monitor device for an equivalent "dummy" impedance termination that has been introduced on the communications circuit at the time that the communications circuit is established. In other words, the equivalent impedance loading of the monitor device becomes an initial and substantially permanent constituent of the communication circuit characteristics to which the communication devices communicating over the communications circuit adapt. Having achieved such adaptation initially, the communications circuit's characteristics remain substantially unchanged, invariant of the presence of a monitor device or not.

FIG. 8 is a flowchart illustrating steps for hitless monitoring access of a communications circuit, in accordance with an exemplary embodiment of the present invention. According to exemplary embodiments, the communications circuit can include a XDSL circuit. In step 805, an impedance element can be connected to the communications circuit when the communications circuit is established. The impedance element causes communication devices communicating via the communications circuit to adapt to the presence of the impedance element. According to exemplary embodiments, the impedance element can include at least one of a resistance element, a capacitance element, an inductance element, or any other type of impedance element, in any desired configuration, using any desired values. In step 810, the impedance element can be switchably connected to a reference ground point. In step 815, the impedance element can be switchably disconnected from a monitor access element. The monitor access element can be configured to be a virtual reference ground point. The monitor access element can be indirectly connected to the impedance element through a monitor bus, or directly connected without the use of an intervening monitor bus. According to exemplary embodiments, the monitor access element can include an amplification element configured as an inverting amplifier. Additionally, each monitor access element can further include an impedance element. According to exemplary embodiments, the impedance element of the monitor access element can include at least one of a resistance element, a capacitance element, an inductance element, or any other type of impedance element, in any desired configuration, using any desired values. Steps 805, 810, and 815 can be considered to be initial conditions that allow the method according to the present exemplary embodiment to be performed without disrupting data communication within the communications circuit.

In step 820, a communications circuit monitor can be connected to the monitor access element. In step 825, the impedance element can be switchably connected to the monitor access element. In step 830, the impedance element can be switchably disconnected from the reference ground point. Consequently, the communications circuit monitor can be connected to the communications circuit without disrupting data communication within the communications circuit. In step 835, the communications circuit can be monitored using the communications circuit monitor.

To disconnect the communications circuit monitor from the communications circuit without disrupting data communication within the communications circuit, in step 840, the impedance element can be switchably connected to the reference ground point. In step 845, the impedance element can be switchably disconnected from the monitor access element. Thereafter, in step 850, the communications circuit monitor can be disconnected from the monitor access element. The process according to the present exemplary embodiment can then be repeated, starting in step 820, to again connect and disconnect the communications circuit monitor without disrupting data communication within the communications circuit.

Figure 9:
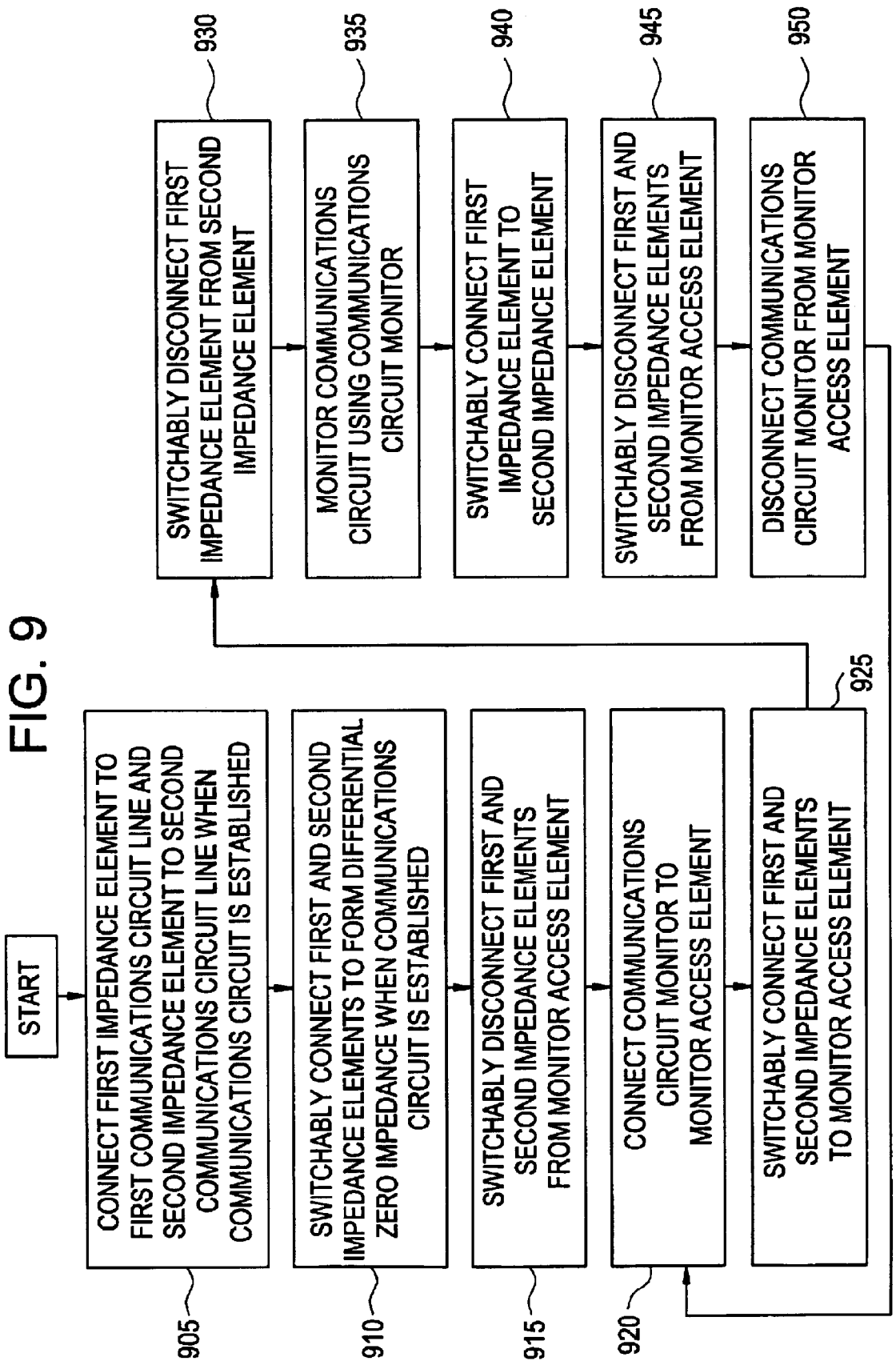
FIG. 9 is a flowchart illustrating steps for hitless monitoring access of a communications circuit, in accordance with an alternative exemplary embodiment of the present invention.

FIG. 9 is a flowchart illustrating steps for hitless monitoring access of a communications circuit, in accordance with an alternative exemplary embodiment of the present invention. According to the alternative exemplary embodiment, the communications circuit can comprise a xDSL circuit. In step 905, a first impedance element can be connected to a first communications circuit line of the communications circuit, and a second impedance element can be connected to a second communications circuit line of the communications circuit when the communications circuit is established. According to the alternative exemplary embodiment, each of the first and second impedance elements can include at least one of a resistance element, a capacitance element, an inductance element, or any other type of impedance element, in any desired configuration, using any desired values. In step 910, the first and second impedance elements can be switchably connected to form a differential impedance across the communications circuit. The differential impedance formed by the first and second impedance elements causes the communications circuit to adapt to the presence of the differential impedance. In step 915, the first and second impedance elements can be switchably disconnected from a monitor access element. Steps 905, 910, and 915 can be considered to be initial conditions that allow the method according to the present alternative exemplary embodiment to be performed without disrupting data communication within the communications circuit.

According to the present alternative exemplary embodiment, the monitor access element can be configured to be a virtual differential zero impedance. The monitor access element can be indirectly connected to each of the first and second impedance elements through, for example, a monitor bus, although the monitor access element can be directly connected to each of the first and second impedance elements without the use of an intervening monitor bus. According to the alternative exemplary embodiment, the monitor access element can include a differential amplification element. Additionally, the monitor access element can include an impedance element. According to the alternative exemplary embodiment, the impedance element of the monitor access element can include at least one of a resistance element, a capacitance element, an inductance element, or any other type of impedance element, in any desired configuration, using any desired values.

In step 920, a communications circuit monitor can be connected to the monitor access element. In step 925, the first and second impedance elements can be switchably connected to the monitor access element. In step 930, the first impedance element can be switchably disconnected from the second impedance element. Consequently, the communications circuit monitor can be connected to the communications circuit without disrupting data communication within the communications circuit. In step 935, the communications circuit can be monitored using the communications circuit monitor.

To disconnect the communications circuit monitor from the communications circuit without disrupting data communication within the communications circuit, in step 940, the first impedance element can be switchably connected to the second impedance element. In step 945, the first and second impedance elements can be switchably disconnected from the monitor access element. Thereafter, in step 950, the communications circuit monitor can be disconnected from the monitor access element. The process according to the present alternative exemplary embodiment can then be repeated, starting in step 920, to again connect and disconnect the communications circuit monitor without disrupting data communication within the communications circuit.

Figure 10:
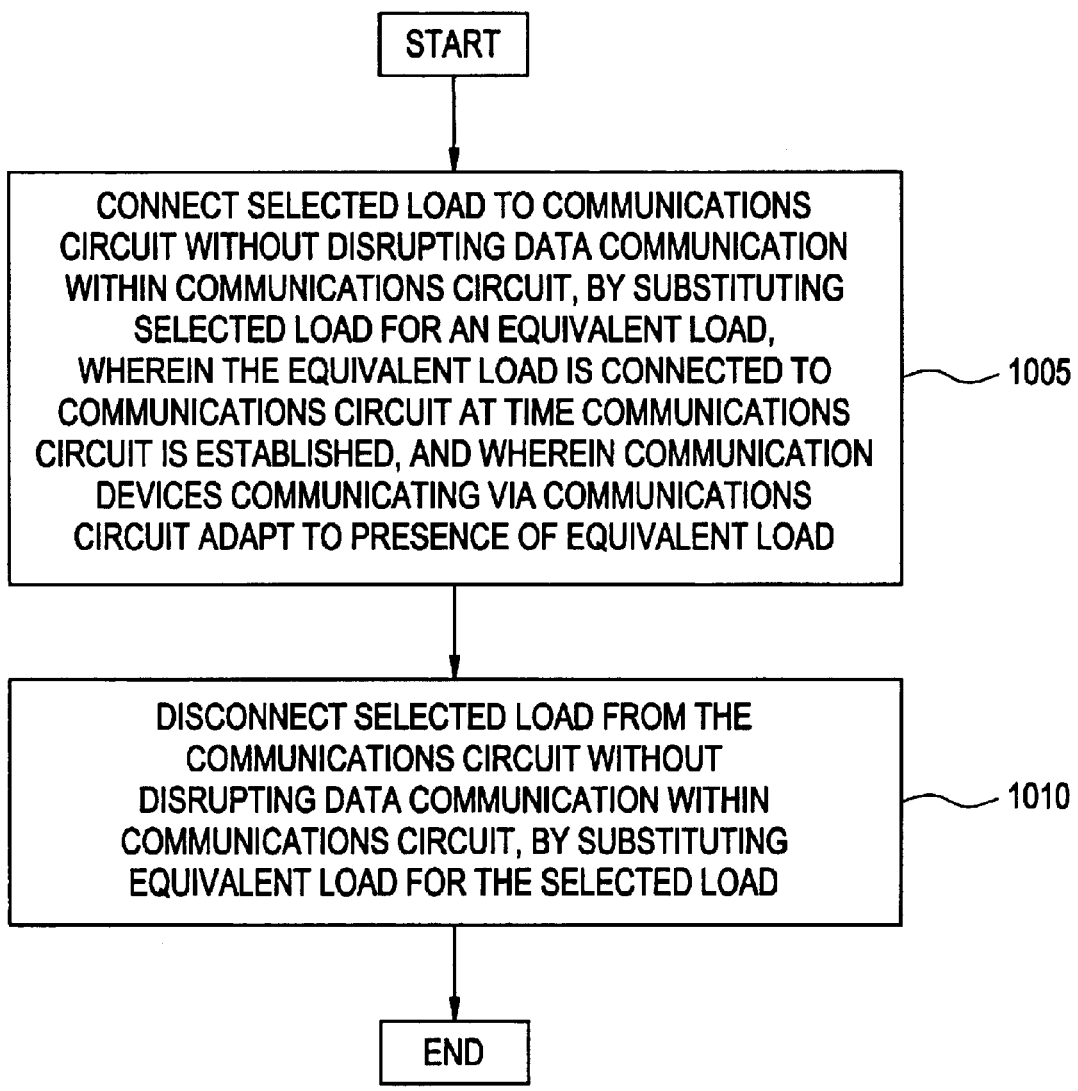
FIG. 10 is a flowchart illustrating steps for applying and disconnecting a selected load to a communications circuit, in accordance with an exemplary embodiment of the present invention.

FIG. 10 is a flowchart illustrating steps for connecting and disconnecting a selected load to/from a communications circuit, in accordance with an exemplary embodiment of the present invention. In step 1005, the selected load can be connected to the communications circuit without disrupting data communication within the communications circuit, by substituting the selected load for an equivalent load. According to the exemplary embodiment, the equivalent load can be connected to the communications circuit at the time the communications circuit is established. The equivalent load causes the communication devices communicating via the communications circuit to adapt to the presence of the equivalent load. In step 1010, the selected load is disconnected from the communications circuit without disrupting data communication within the communications circuit, by substituting the equivalent load for the selected load.

Figure 11:
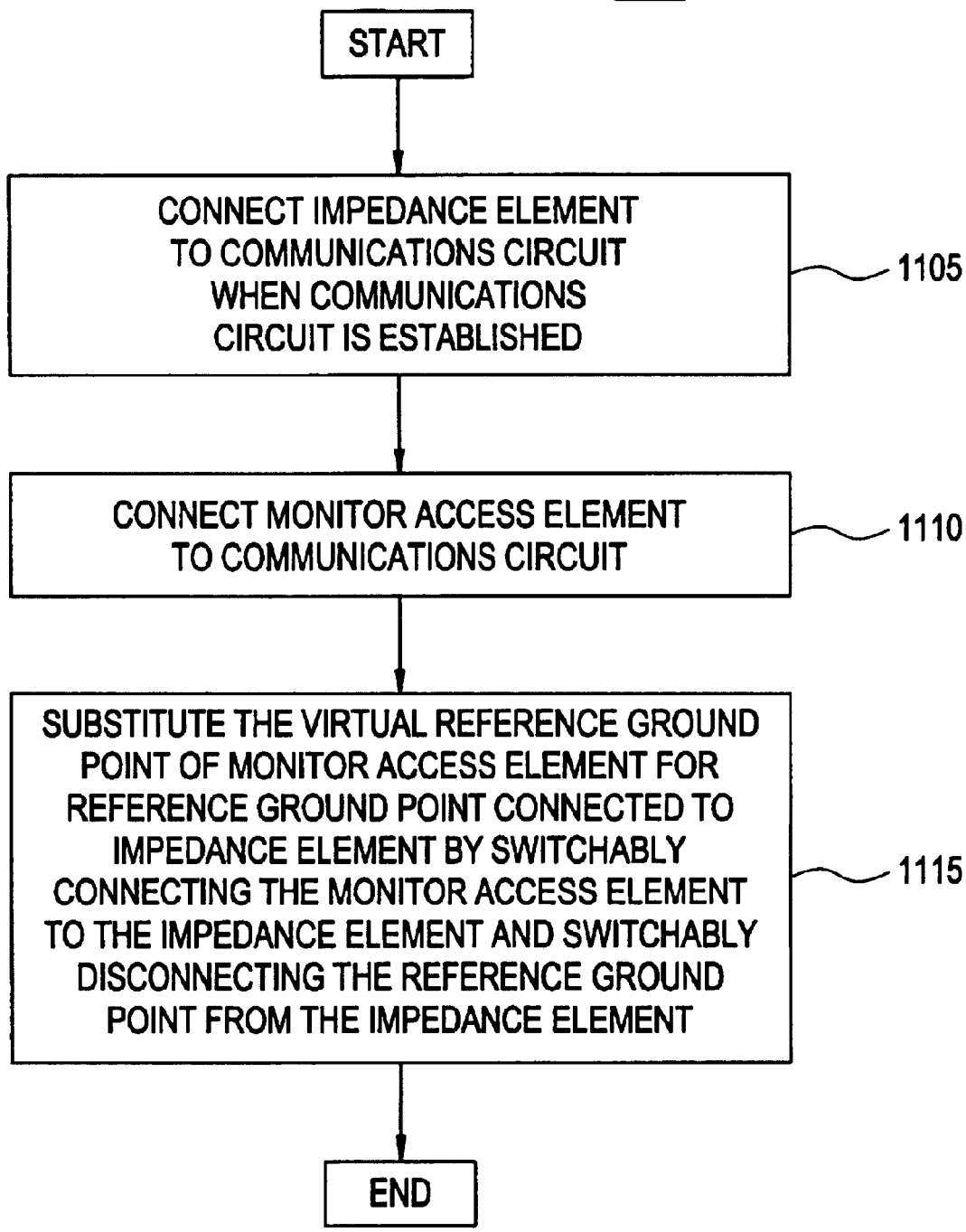
FIG. 11 is a flowchart illustrating steps for the step of FIG. 10 of connecting a selected load to a communications circuit, in accordance with an exemplary embodiment of the present invention.

FIG. 11 is a flowchart illustrating steps for the step 1005 of FIG. 10 of connecting a selected load to a communications circuit, in accordance with an exemplary embodiment of the present invention. According to exemplary embodiments, the selected load can comprise a monitor access element and the equivalent load can comprise an impedance element. For the step 1005 of FIG. 10 of connecting, in step 1105 of FIG. 11, the impedance element can be connected to the communications circuit when the communications circuit is established. The impedance element causes the communication devices communicating via the communications circuit to adapt to the presence of the impedance element. The impedance element is switchably connected to a reference ground point. Step 1105 can be considered to be an initial condition that allows the method according to the present exemplary embodiment to be performed without disrupting data communication within the communications circuit.

In step 1110, the monitor access element can be connected to the communications circuit. The monitor access element can be configured to be a virtual reference ground point. In step 1115, the virtual reference ground point of the monitor access element can be substituted for the reference ground point of the impedance element by switchably connecting the monitor access element to the impedance element and switchably disconnecting the reference ground point from the impedance element. Consequently, the monitor access element can be connected to the communications circuit without disrupting data communication within the communications circuit.

Figure 12:
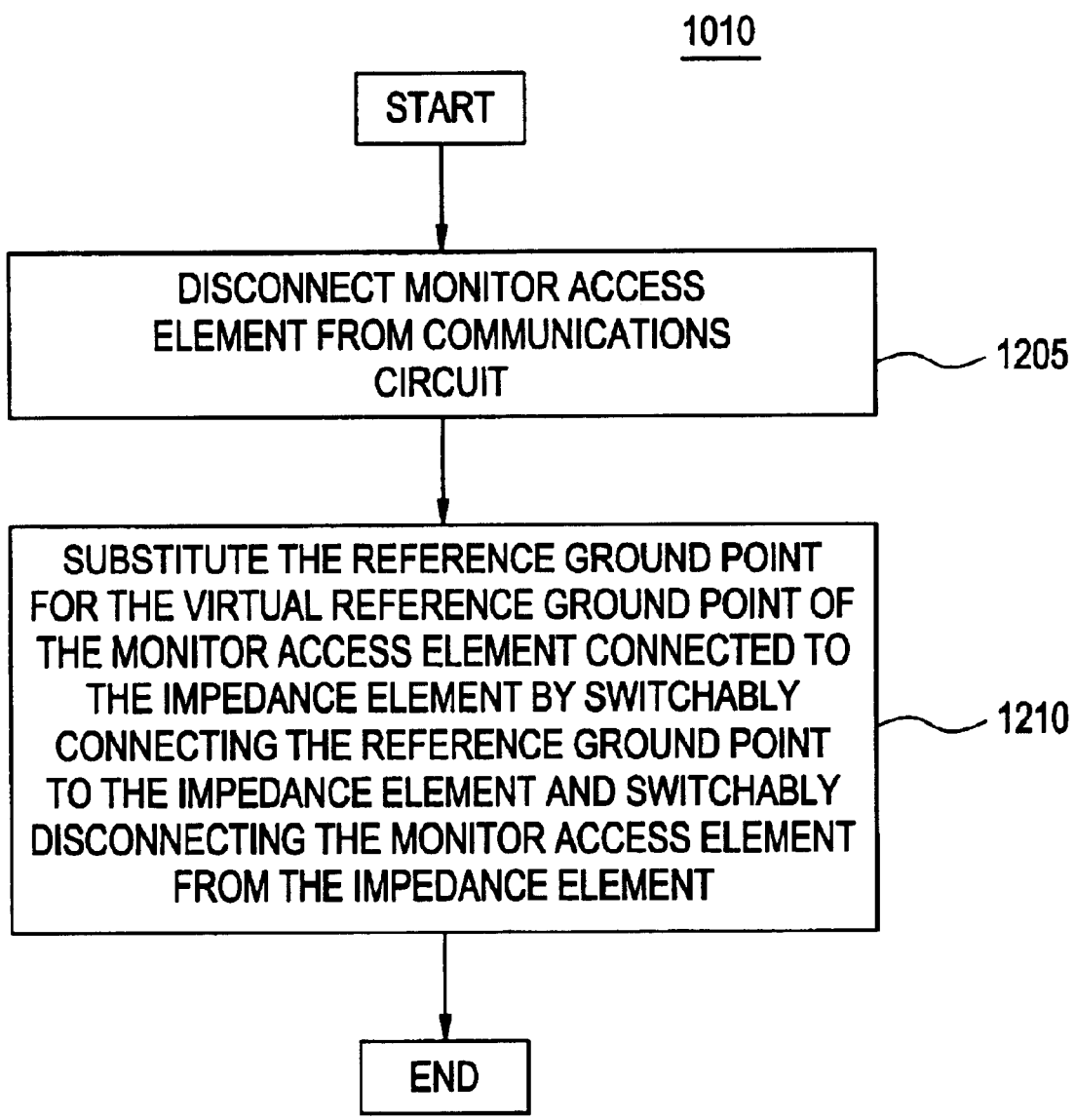
FIG. 12 is a flowchart illustrating steps for the step of FIG. 10 of disconnecting a selected load from a communications circuit, in accordance with an exemplary embodiment of the present invention.

FIG. 12 is a flowchart illustrating steps for the step 1010 of FIG. 10 of disconnecting a selected load from a communications circuit, in accordance with an exemplary embodiment of the present invention. For the step 1010 of FIG. 10 of disconnecting, in step 1205 of FIG. 12, the monitor access element can be disconnected from the communications circuit. In step 1210, the reference ground point of the impedance element can be substituted for the virtual reference ground point of the monitor access element by switchably connecting the reference ground point to the impedance element and switchably disconnecting the monitor access element from the impedance element. Consequently, the monitor access element can be disconnected from the communications circuit without disrupting data communication within the communications circuit.

Figure 13:
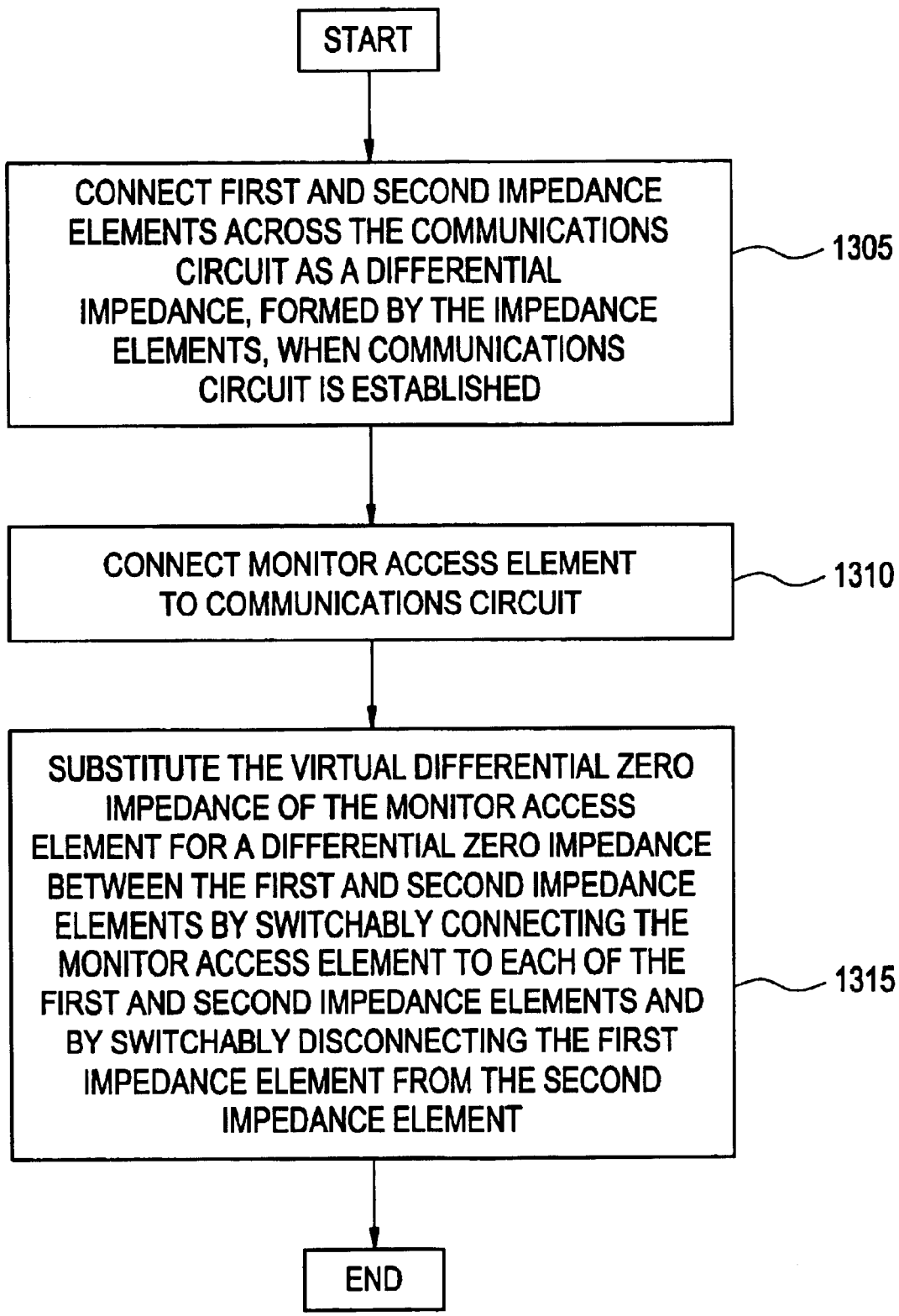
FIG. 13 is a flowchart illustrating steps for the step of FIG. 10 of connecting a selected load to a communications circuit, in accordance with an alternative exemplary embodiment of the present invention.

FIG. 13 is a flowchart illustrating steps for the step 1005 of FIG. 10 of connecting a selected load to a communications circuit, in accordance with an alternative exemplary embodiment of the present invention. According to the alternative exemplary embodiment, the selected load can comprise a monitor access element and the equivalent load can comprise a first and a second impedance element. For the step 1005 of FIG. 10 of connecting, in step 1305 of FIG. 13, the first and the second impedance element can be connected to the communications circuit when the communications circuit is established. The first and second impedance elements can be switchably connected across the communications circuit. A differential impedance formed by the first and second impedance elements causes communication devices communicating via the communications circuit to adapt to the presence of the differential impedance. Step 1305 can be considered to be an initial condition that allows the method according to the present alternative exemplary embodiment to be performed without disrupting data communication within the communications circuit.

In step 1310, the monitor access element can be connected to the communications circuit. The monitor access element can be configured to be a virtual differential zero impedance. In step 1315, the virtual differential zero impedance of the monitor access element can be substituted for the differential zero impedance between the first and second impedance elements by switchably connecting the monitor access element to each of the first and second impedance elements and switchably disconnecting the first impedance element from the second impedance element. Consequently, the monitor access element can be connected to the communications circuit without disrupting data communication within the communications circuit.

Figure 14:
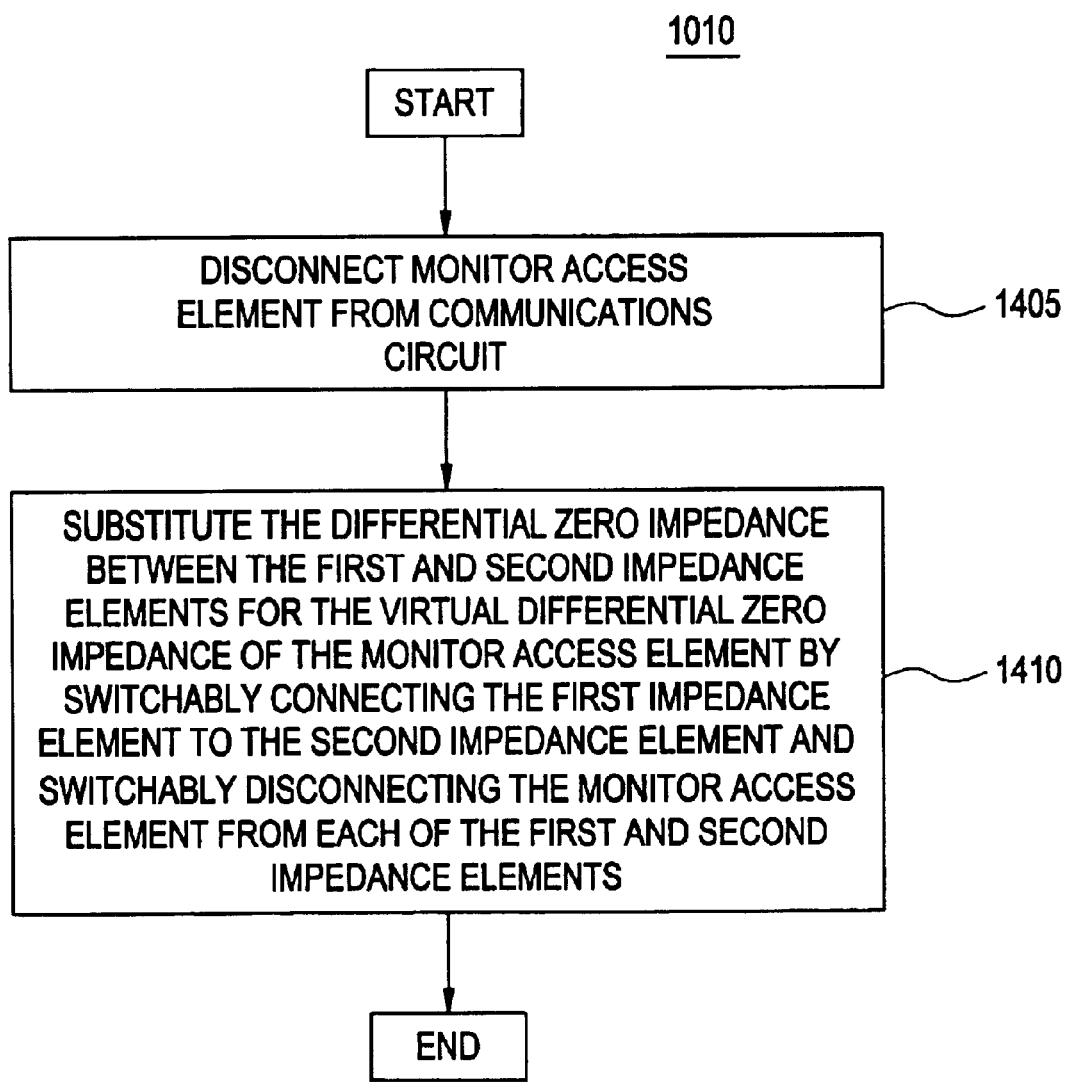
FIG. 14 is a flowchart illustrating steps for the step of FIG. 10 of disconnecting a selected load from a communications circuit, in accordance with an alternative exemplary embodiment of the present invention.

FIG. 14 is a flowchart illustrating steps for the step 1010 of FIG. 10 of disconnecting a selected load from a communications circuit, in accordance with an alternative exemplary embodiment of the present invention. For the step 1010 of FIG. 10 of disconnecting, in step 1405 of FIG. 14, the monitor access element can be disconnected from the communications circuit. In step 1410, the differential zero impedance between the first and second impedance elements can be substituted for the virtual differential zero impedance of the monitor access element by switchably connecting the first impedance element to the second impedance element and switchably disconnecting the monitor access element from each of the first and second impedance elements. Consequently, the monitor access element can be disconnected from the communications circuit without disrupting data communication within the communications circuit.

Exemplary embodiments of the present invention can be used in or in conjunction with, for example, communications testing equipment for testing communications circuits, such as, for example, xDSL circuits, particularly where the communication devices (e.g., xDSL modems) communicating over the communications circuit do not adapt rapidly and continuously during operation to changing line conditions. Exemplary embodiments can be used with both balanced and unbalanced media to allow connection to and monitoring of communications circuits without disruption to the information communicated over the communications circuit. Exemplary embodiments of the present invention can be embodied, in whole or in part, in hardware, firmware, any other type of electronic circuitry, software, or any combination thereof.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents, foreign patents, and publications discussed above are hereby incorporated herein by reference in their entireties.

What is claimed is:

1. A system for monitoring a communications circuit, comprising:

at least one impedance element, wherein the at least one impedance element is configured to be connected to the communications circuit when the communications circuit is established, and wherein the at least one impedance element causes communication devices communicating via the communications circuit to adapt to a presence of the at least one impedance element;

at least one reference ground point, wherein each impedance element is configured to be switchably connected to a respective reference ground point;

at least one monitor access element, wherein each impedance element is configured to be switchably disconnected from a respective monitor access element, and wherein each monitor access element is configured to be a virtual reference ground point; and at least one communications circuit monitor, wherein the at least one communications circuit monitor is configured to be connected to the respective monitor access element, and wherein to monitor the communications circuit, the at least one impedance element is configured to be switchably connected to the respective monitor access element and the at least one impedance element is configured to be switchably disconnected from the respective reference ground point, thereby connecting the at least one communications circuit monitor to the communications circuit with an absence of disruption to data communication within the communications circuit.

2. The system of claim 1, wherein the at least one impedance element is configured to be switchably connected to the respective at least one reference ground point, and the at least one impedance element is configured to be switchably disconnected from the respective at least one monitor access element, thereby disconnecting the communications circuit monitor from the communications circuit with the absence of disruption to data communication within the communications circuit.

3. The system of claim 2, wherein the communications circuit monitor is configured to be disconnected from the at least one monitor access element.

4. The system of claim 1, wherein each impedance element comprises at least one of a resistance element, a capacitance element, and an inductance element.

5. The system of claim 1, wherein each monitor access element comprises an amplification element configured as an inverting amplifier.

6. The system of claim 5, wherein each monitor access element further comprises an impedance element.

7. The system of claim 6, wherein the impedance element of the monitor access element comprises at least one of a resistance element, a capacitance element, and an inductance element.

8. The system of claim 1, wherein the communications circuit comprises a xDSL circuit.

9. The system of claim 1, further comprising:
a monitor bus, wherein each monitor access element is configured to be connected to each impedance element through the monitor bus.

10. A system for monitoring a communications circuit, comprising:
a first impedance element configured to be connected to a first communications circuit line of the communications circuit when the communications circuit is established;
a second impedance element configured to be connected to a second communications circuit line of the communications circuit when the communications circuit is established, wherein the first and second impedance elements are configured to be switchably connected to form a differential impedance across the communications circuit, and wherein the differential impedance formed by the first and second impedance elements causes communication devices communicating via the communications circuit to adapt to a presence of the differential impedance;
a monitor access element, wherein the first and second impedance elements are configured to be switchably disconnected from the monitor access element, and wherein the monitor access element is configured to be a virtual differential zero impedance; and
a communications circuit monitor, wherein the communications circuit monitor is configured to be connected to the monitor access element, and
wherein to monitor the communications circuit, the first and second impedance elements are configured to be switchably connected to the monitor access element, and the first impedance element is configured to be switchably disconnected from the second impedance element, thereby connecting the communications circuit monitor to the communications circuit with an absence of disruption to data communication within the communications circuit.

11. The system of claim 10, wherein the first impedance element is configured to be switchably connected to the second impedance element, and the first and second impedance elements are configured to be switchably disconnected from the monitor access element, thereby disconnecting the communications circuit monitor from the communications circuit with the absence of disruption to data communication within the communications circuit.

12. The system of claim 11, wherein the communications circuit monitor is configured to be disconnected from the monitor access element.

13. The system of claim 10, wherein each of the first and second impedance elements comprises at least one of a resistance element, a capacitance element, and an inductance element.

14. The system of claim 10, wherein the monitor access element comprises, a differential amplification element.

15. The system of claim 14, wherein the monitor access element further comprises an impedance element.

16. The system of claim 15, wherein the impedance element of the monitor access element comprises at least one of a resistance element, a capacitance element, and an inductance element.

17. The system of claim 10, wherein the communications circuit comprises a xDSL circuit.

18. The system of claim 10, further comprising:
a monitor bus, wherein the monitor access element is configured to be connected to at least one of the first and second impedance elements through the monitor bus.

19. A method for monitoring a communications circuit, comprising the steps of:
connecting an impedance element to the communications circuit when the communications circuit is established, wherein the impedance element causes communication devices communicating via the communications circuit to adapt to a presence of the impedance element;
switchably connecting the impedance element to a reference ground point;
switchably disconnecting the impedance element from a monitor access element, wherein the monitor access element is configured to be a virtual reference ground point;
connecting a communications circuit monitor to the monitor access element;
switchably connecting the impedance element to the monitor access element;
switchably disconnecting the impedance element from the reference ground point, thereby connecting the communications circuit monitor to the communications circuit with an absence of disruption to data communication within the communications circuit; and
monitoring the communications circuit using the communications circuit monitor.

20. The method of claim 19, comprising the steps of:
switchably connecting the impedance element to the reference ground point; and
switchably disconnecting the impedance element from the monitor access element, thereby disconnecting the communications circuit monitor from the communications circuit with the absence of disruption to data communication within the communications circuit.

21. The method of claim 20, comprising the step of:
disconnecting the communications circuit monitor from the monitor access element.

22. The method of claim 19, comprising the step of:
connecting the monitor access element to the impedance element through a monitor bus.

23. A method for monitoring a communications circuit, comprising the steps of:
connecting a first impedance element to a first communications circuit line of the communications circuit and a second impedance element to a second communications circuit line of the communications circuit when the communications circuit is established;
switchably connecting the first and second impedance elements to form a differential impedance across the communications circuit, wherein the differential impedance formed by the first and second impedance elements causes communication devices communicating via the communications circuit to adapt to a presence of the differential impedance;
switchably disconnecting the first and second impedance elements from a monitor access element, wherein the monitor access element is configured to be a virtual differential zero impedance;
connecting a communications circuit monitor to the monitor access element;
switchably connecting the first and second impedance elements to the monitor access element;
switchably disconnecting the first impedance element from the second impedance element, thereby connecting the communications circuit monitor to the communications circuit with an absence of disruption to data communication within the communications circuit; and
monitoring the communications circuit using the communications circuit monitor.

24. The method of claim 23, comprising the steps of:
switchably connecting the first impedance element to the second impedance element; and
switchably disconnecting the first and second impedance elements from the monitor access element, thereby disconnecting the communications circuit monitor from the communications circuit with the absence of disruption to data communication within the communications circuit.

25. The method of claim 24, comprising the step of:
disconnecting the communications circuit monitor from the monitor access element.

26. The method of claim 23, comprising the step of:
connecting the monitor access element to at least one of the first and second impedance elements through a monitor bus.

27. A method for connecting and disconnecting a selected load to/from a communications circuit, comprising the steps of:
connecting the selected load to the communications circuit with an absence of disruption to data communication within the communications circuit, by substituting the selected load for an equivalent load,
wherein the equivalent load is configured to be connected to the communications circuit at the time the communications circuit is established, and
wherein the equivalent load causes communication devices communicating via the communications circuit to adapt to a presence of the equivalent load; and
disconnecting the selected load from the communications circuit with the absence of disruption to data communication within the communications circuit, by substituting the equivalent load for the selected load.

28. The method of claim 27, wherein the selected load comprises a monitor access element and the equivalent load comprises an impedance element, and wherein the step of connecting comprises the steps of:
connecting the impedance element to the communications circuit when the communications circuit is established, wherein the impedance element causes communication devices communicating via the communications circuit to adapt to the presence of the impedance element, and wherein the impedance element is configured to be switchably connected to a reference ground point;
connecting the monitor access element to the communications circuit, wherein the monitor access element is configured to be a virtual reference ground point; and
substituting the virtual reference ground point of the monitor access element for the reference ground point of the impedance element by switchably connecting the monitor access element to the impedance element and switchably disconnecting the reference ground point from the impedance element, wherein the monitor access element is connected to the communications circuit with the absence of disruption to data communication within the communications circuit.

29. The method of claim 28, wherein the step of disconnecting comprises the steps of:
disconnecting the monitor access element from the communications circuit; and
substituting the reference ground point of the impedance element for the virtual reference ground point of the monitor access element by switchably connecting the reference ground point to the impedance element and switchably disconnecting the monitor access element from the impedance element, wherein the monitor access element is disconnected from the communications circuit with the absence of disruption to data communication within the communications circuit.

30. The method of claim 27, wherein the selected load comprises a monitor access element and the equivalent load comprises a first and a second impedance element, and wherein the step of connecting comprises the steps of:
connecting the first and the second impedance elements to the communications circuit when the communications circuit is established, wherein the first and second impedance elements are configured to be switchably connected across the communications circuit, and wherein a differential impedance formed by the first and second impedance elements causes communication devices communicating via the communications circuit to adapt to the presence of the differential impedance;
connecting the monitor access element to the communications circuit, wherein the monitor access element is configured to be a virtual differential zero impedance; and substituting the virtual differential zero impedance of the monitor access element for a differential zero impedance between the first and second impedance elements by switchably connecting the monitor access element to each of the first and second impedance elements and switchably disconnecting the first impedance element from the second impedance element, wherein the monitor access element is connected to the communications circuit with the absence of disruption to data communication within the communications circuit.

31. The method of claim 30, wherein the step of disconnecting comprises the steps of:

disconnecting the monitor access element from the communications circuit; and substituting the differential zero impedance between the first and second impedance elements for the virtual differential zero impedance of the monitor access element by switchably connecting the first impedance element to the second impedance element and switchably disconnecting the monitor access element from each of the first and second impedance elements, wherein the monitor access element is disconnected from the communications circuit with the absence of disruption to data communication within the communications circuit.

* * * * *